(12) United States Patent
Zhang

(10) Patent No.: US 12,197,376 B1
(45) Date of Patent: Jan. 14, 2025

(54) CALCULATOR WITH HANDWRITING PAD

(71) Applicant: Shenzhen Xin Niu E-commerce Co., Ltd, Shenzhen (CN)

(72) Inventor: Yingbin Zhang, Shenzhen (CN)

( * ) Notice: Subject to any disclaimer, the term of this patent is extended or adjusted under 35 U.S.C. 154(b) by 0 days.

(21) Appl. No.: 18/739,704

(22) Filed: Jun. 11, 2024

(30) Foreign Application Priority Data

Jun. 3, 2024 (CN) .......................... 202421258755.7

(51) Int. Cl.
G06F 1/16 (2006.01)
G06F 3/0354 (2013.01)
G06F 3/04883 (2022.01)
G06F 15/02 (2006.01)

(52) U.S. Cl.
CPC ...... G06F 15/0216 (2013.01); G06F 3/03545 (2013.01); G06F 3/04883 (2013.01)

(58) Field of Classification Search
CPC .... G06F 1/1637; G06F 1/1675; G06F 1/1683; G06F 3/0488; G06F 3/04883; G06F 15/0208; G06F 15/0225
See application file for complete search history.

(56) References Cited

U.S. PATENT DOCUMENTS

| | | | |
|---|---|---|---|
| 5,476,336 A * | 12/1995 | Osiecki | B42F 11/02 283/117 |
| 6,396,481 B1 * | 5/2002 | Challa | H04B 10/40 345/169 |
| 9,056,696 B1 * | 6/2015 | Reyes | A45C 11/00 |
| 12,056,334 B2 * | 8/2024 | Tyler | G06F 3/0488 |
| 2004/0113417 A1 * | 6/2004 | Chareas | B42D 5/042 281/44 |
| 2008/0012839 A1 * | 1/2008 | Feague | G06F 3/0321 361/679.25 |
| 2008/0042978 A1 * | 2/2008 | Perez-Noguera | G06F 3/0202 345/168 |
| 2008/0084057 A1 * | 4/2008 | Falkenstein | G06F 15/16 281/44 |
| 2008/0123286 A1 * | 5/2008 | Watanabe | G06F 1/1635 361/679.27 |
| 2009/0213081 A1 * | 8/2009 | Case, Jr. | G06F 3/04886 345/173 |
| 2009/0221335 A1 * | 9/2009 | Nakazawa | H04M 1/0216 455/575.4 |
| 2011/0032668 A1 * | 2/2011 | Lee | H04M 1/0239 361/679.01 |

(Continued)

Primary Examiner — Anthony Q Edwards

(57) ABSTRACT

A calculator with a handwriting pad includes a handwriting pad unit, a calculator unit, and a handwriting pen. The handwriting pen is detachably arranged on the calculator unit or the handwriting pad unit, and the handwriting pad unit is connected to the calculator unit. When in a storage state, the handwriting pad unit and the calculator unit are arranged in an overlapped manner from up to down. When in an unfolded state, a surface of the handwriting pad unit is horizontally arranged side by side with the calculator unit. The handwriting pad unit, the calculator unit, and the handwriting pen are connected together so that a user can directly access them during use without having to search for them one by one. The handwriting pad unit and the calculator unit can be stacked together when not in use, reducing an overall volume for easy carrying and storage.

19 Claims, 25 Drawing Sheets

(56) References Cited

U.S. PATENT DOCUMENTS

| | | | |
|---|---|---|---|
| 2011/0128216 A1* | 6/2011 | Renwick | G06F 1/1618 |
| | | | 361/679.01 |
| 2014/0101577 A1* | 4/2014 | Kwak | G06F 3/1431 |
| | | | 715/761 |
| 2015/0015513 A1* | 1/2015 | Kwak | G06F 3/0486 |
| | | | 345/173 |
| 2015/0212647 A1* | 7/2015 | Kim | G06F 3/1423 |
| | | | 345/173 |
| 2016/0285305 A1* | 9/2016 | Yamanaka | H02J 7/35 |
| 2016/0378217 A1* | 12/2016 | Kim | G06F 3/04847 |
| | | | 345/173 |
| 2017/0034446 A1* | 2/2017 | Park | G06F 1/1641 |
| 2021/0323341 A1* | 10/2021 | Gentile | B43L 5/02 |
| 2023/0048811 A1* | 2/2023 | Radford | G06F 3/0426 |
| 2024/0260340 A1* | 8/2024 | Yamazaki | H10K 59/40 |

* cited by examiner

CALCULATOR WITH HANDWRITING PAD

CROSS-REFERENCE TO RELATED APPLICATIONS

The application claims priority of Chinese patent application NO. 2024212587557, filed on 2024 Jun. 3, which is incorporated herein by reference in its entireties.

TECHNICAL FIELD

The present invention relates to the technical field of calculators, in particular to a calculator with a handwriting pad.

BACKGROUND ART

When practicing arithmetic skills, a user usually calculate the required value on a notebook. After calculation, the user will use a calculator for verification. Moreover, when the user has a large amount of data to calculate, a simple record of the data will be made in advance, so as to facilitate subsequent calculations by the calculator. In this case, the user need to find paper, a pen, and a calculator for operation, but these tools are scattered and require the user to obtain them one by one, which is relatively cumbersome. Moreover, the paper, the pen, and the calculator are inconvenient for the user to carry and store when the user goes out.

SUMMARY

The main purpose of the present invention is to provide a calculator with a handwriting pad for solving the problem of cumbersome and inconvenient carrying and storage for users caused by existing calculations requiring finding paper, a pen, and a calculator and obtaining them one by one.

In order to solve the above-mentioned technical problem, a technical solution is provided by the present invention.

A calculator with a handwriting pad includes a handwriting pad unit, a calculator unit, and a handwriting pen. The handwriting pen is detachably arranged on the calculator unit or the handwriting pad unit, and the handwriting pad unit is connected to the calculator unit.

When in a storage state, the handwriting pad unit and the calculator unit are arranged in an overlapped manner from up to down.

When in an unfolded state, a surface of the handwriting pad unit is horizontally arranged side by side with the calculator unit.

As a preferred embodiment, the handwriting pad unit is rotationally connected to the calculator unit.

As a preferred embodiment, at least one first rotating part is provided on the handwriting pad unit, and a second rotating part is provided on the calculator unit for use in conjunction with the first rotating part. The first rotating part is connected to the second rotating part through a shaft rod.

At least one first magnetic attraction element is provided within the calculator unit, and a second magnetic attraction element is provided on the handwriting pad unit for use with the first magnetic attraction element. The first magnetic attraction element is attracted with the second magnetic attraction element when the handwriting pad unit and the calculator unit are in the storage state.

The calculator unit is equipped with a storage slot for storing the handwriting pen, and the handwriting pen is fixed by a buckle structure when placed in the storage slot.

As a preferred embodiment, the calculator with the handwriting pad further includes a flexible connection wire.

The calculator unit is equipped with a first circuit board and a first clear switch electrically connected to the first circuit board. The handwriting pad unit is equipped with a first liquid crystal display (LCD) screen. The calculator unit is provided with a first wiring hole on one side near the handwriting pad unit. The handwriting pad unit is provided with a second wiring hole on one side near the calculator unit. The flexible connection wire passes through the first wiring hole and the second wiring hole. One end of the flexible connection wire is placed inside the calculator unit and soldered to the first circuit board, and an opposite end of the flexible connection wire is placed inside the handwriting pad unit and soldered to the first LCD screen. When the first clear switch is operated, the first circuit board clears a content displayed on the first LCD screen through the flexible connection wire.

The calculator unit is further equipped with a first locking switch electrically connected to the first circuit board. When the first circuit board receives an electrical signal fed back by the first locking switch, the first circuit board locks the content displayed on the first LCD screen through the flexible connection wire.

As a preferred embodiment, a side wall of the first wiring hole and/or a side wall of the second wiring hole along a lengthwise direction are/is smooth curved surface(s).

A total sum of a distance between a bottom surface of the first circuit board and the first wiring hole, a width of the first wiring hole, a distance between the first wiring hole and the second wiring hole, a width of the second wiring hole, and a distance between the second wiring hole and the first LCD screen is a first length. After a part welded to the first circuit board and a part welded to the first LCD screen are deducted from the flexible connection wire, a remaining length of the flexible connection wire is greater than the first length.

As a preferred embodiment, the first clear switch is a Hall switch. An end of the handwriting pen is provided with a magnetic field magnet for generating a magnetic field. When the first circuit board receives an electrical signal fed back by the Hall switch, the content displayed on the first LCD screen is cleared through the flexible connection wire.

As a preferred embodiment, the calculator unit is equipped with a first battery, a second circuit board, a first display, and a first button module group. The first circuit board and the first display are both electrically connected to the second circuit board, and the first battery is electrically connected to the first circuit board. The first battery, the first circuit board, and the first display are all positioned above the second circuit board. The second circuit board performs a calculation on input data when the first button module group is operated.

The calculator unit is equipped with a first photovoltaic panel. The first photovoltaic panel is electrically connected to the second circuit board. The first battery is a rechargeable battery. The first photovoltaic panel is configured for converting light energy into electrical energy and transmitting the electrical energy to the second circuit board. The second circuit board is configured for processing the electrical energy transmitted by the first photovoltaic panel and then storing the electrical energy into the first battery through the first circuit board.

As a preferred embodiment, the first circuit board is integrated with a power circuit and a boost module. The power circuit is respectively electrically connected to the second circuit board, the first battery, and the boost module. The boost module is respectively electrically connected to the first clear switch and the first LCD screen. When the boost module detects the electrical signal fed back by the first clear switch, the boost module boosts the voltage output by the power circuit and then transfers the boosted voltage to the first LCD screen to clear the content on the first LCD screen.

As a preferred embodiment, the first battery is a button battery, and an arched first conductive sheet is provided on the first circuit board. The calculator unit is detachably equipped with a first pulling element. A first receiving slot is defined in the first pulling element. The first battery is positioned in the first receiving slot. When the first pulling element is partially placed inside the calculator unit, one surface of the first battery abuts against a solder pad on the first circuit board, and an opposite surface of the first battery abuts against the first conductive sheet.

The first pulling element is fixed to the calculator unit by a screw at one end of the first receiving slot. The first pulling element is provided with a first elastic element at an opposite end of the first receiving slot. A first fixing block is provided on the first elastic element. The calculator unit is provided with a first fixing slot at a position corresponding to the first fixing block. The first fixing block is placed in the first fixing slot when the first pulling element is installed on the calculator unit.

As a preferred embodiment, the handwriting pad unit is connected to the calculator unit through magnetic attraction.

As a preferred embodiment, a plurality of third magnetic attraction elements are provided on the handwriting pad unit, and at least one part of the third magnetic attraction elements are positioned near a peripheral side of the handwriting pad unit. The calculator unit is equipped with fourth magnetic attraction elements, and the fourth magnetic attraction elements are attracted with the third magnetic attraction elements.

The third magnetic attraction elements are magnets or iron blocks, and the fourth magnetic attraction elements are magnets. Alternatively, the third magnetic attraction elements are magnets, and the fourth magnetic attraction elements are iron blocks.

As a preferred embodiment, a total number of the third magnetic attraction elements and a total number of the fourth magnetic attraction elements are both four. The four third magnetic attraction elements are respectively arranged near four end corners of the handwriting pad unit.

Both the third magnetic attraction elements and the fourth magnetic attraction elements are in a long strip shape. Three of the third magnetic attraction elements are arranged along a lengthwise direction of the calculator unit, and one of the third magnetic attraction elements is arranged along a width direction of the calculator unit.

As a preferred embodiment, the handwriting pad unit is slidably connected to the calculator unit.

As a preferred embodiment, a sliding slot is provided on a back surface of the handwriting pad unit for accommodating the calculator unit. When in the storage state, the calculator unit is placed inside the sliding slot.

A position limiting convex bar is provided on a side wall of the sliding slot, and a second fixing slot is provided on the position limiting convex bar. A position limiting slot is provided on a side wall of the calculator unit for use in conjunction with the position limiting convex bar. The position limiting slot is positioned near an end of the calculator. A second fixing block is provided on the position limiting slot for use in conjunction with the second fixing slot. When in the storage state, the position limiting convex bar is placed in the position limiting slot, and the second fixing block is placed in the second fixing slot.

As a preferred embodiment, the handwriting pad unit protrudes outward on one side away from the sliding slot to form a supporting convex block.

As a preferred embodiment, when the handwriting pad unit is connected to the calculator unit by one of the methods of rotation, magnetic attraction, buckle and sliding;

The handwriting pad unit includes a first outer housing, a second battery, a third circuit board, and a second liquid crystal display (LCD) screen. The third circuit board, the second battery, and the second LCD screen are all arranged inside the first outer housing. The second LCD screen and the second battery are both electrically connected to the third circuit board. The third circuit board is positioned above or below the second LCD screen. A first display opening is defined in a surface of the first outer housing at a position corresponding to the second LCD screen.

The third circuit board is equipped with a second clear switch. The first outer housing is equipped with a first pressing element at a position corresponding to the second clear switch. The first pressing element is connected to the second clear switch. When the third circuit board detects an electrical signal fed back by the second clear switch, the third circuit board controls the second LCD screen to clear the displayed content.

A second locking switch is provided on the third circuit board. A first operating element is arranged on the first outer housing at a position corresponding to the second locking switch. The first operating element is connected to the second locking switch. When the third circuit board detects an electrical signal fed back by the second locking switch, the content displayed on the second LCD screen is locked.

The second locking switch is a dual in-line package (DIP) switch. The first pressing element is positioned on a surface of the first outer housing equipped with the first display opening, and the second locking switch is positioned at a top portion of the first outer housing.

As a preferred embodiment, the top portion of the first outer housing is detachably provided with a second pulling element. A second receiving slot is defined in the second pulling element. A second conductive sheet in an arched shape is provided on the third circuit board. The second battery is a button battery, and the second battery is installed on the second receiving slot. When the second pulling element is assembled onto the first outer housing, the second receiving slot is placed inside the first outer housing and below the second conductive sheet. One surface of the second battery abuts against the second conductive sheet, and an opposite surface of the second battery abuts against a solder pad on the third circuit board.

One end of the second pulling element is fixed to the first outer housing by a screw. The second pulling element is provided with a third fixing block on a side wall corresponding to the second receiving slot. The first outer housing is provided with a third fixing slot at a position corresponding to the third fixing block. The third fixing block is placed in the third fixing slot when the second pulling element is installed on the first outer housing.

As a preferred embodiment, the calculator unit includes a second outer housing, a second display, a fourth circuit board, a second button module group, and a third battery. The fourth circuit board, the third battery, and the second display are all positioned inside the second outer housing. The second button module group is positioned on the second outer housing and corresponds to the fourth circuit board. The third battery and the second display are both electrically connected to the fourth circuit board. The third battery and the second display are both positioned above the fourth circuit board. The fourth circuit board calculates the input data when the second button module group is operated.

The calculator unit is equipped with a second photovoltaic panel. The second photovoltaic panel is electrically connected to the fourth circuit board. The third battery is a rechargeable battery. The second photovoltaic panel is configured for converting light energy into electrical energy and transmitting the electrical energy to the fourth circuit board. The fourth circuit board is configured for processing the electrical energy transmitted by the second photovoltaic panel, and then the electrical energy is stored into the third battery through the fourth circuit board.

As a preferred embodiment, a top portion of the second outer housing is detachably equipped with a third pulling element at a position corresponding to the third battery. The third pulling element is provided with a third receiving slot. The fourth circuit board is provided with an arched third conductive sheet. The third battery is a button battery. The third battery is installed on the third receiving slot. When the third pulling element is assembled onto the second outer housing, the third receiving slot is placed inside the second outer housing and below the third conductive sheet. One surface of the third battery abuts against the third conductive sheet, and an opposite surface of the third battery abuts against a solder pad on the fourth circuit board.

As a preferred embodiment, the handwriting pad unit is connected to the calculator unit through a buckle.

One side wall of the handwriting pad unit is equipped with connecting fixing blocks, and one side wall of the calculator unit is equipped with fourth fixing slots for use in conjunction with the connecting fixing blocks. The connecting fixing blocks are placed inside the fourth fixing slots when the handwriting pad unit is connected to the calculator unit.

The handwriting pad unit is equipped with a fifth magnetic attraction element. The calculator unit is equipped with a sixth magnetic attraction element. The fifth magnetic attraction element is attracted with the sixth magnetic attraction element when the handwriting pad unit and the computer unit are stored.

Compared to the prior art, in the present invention, the handwriting pad unit, the calculator unit, and the handwriting pen are connected together, so that a user can directly access them during use without having to search for them one by one. The handwriting pad unit and the calculator unit can be stacked together when not in use, reducing an overall volume for easy carrying and storage. Moreover, the handwriting pad unit and calculator unit can be arranged horizontally side by side when in use, and in conjunction with the handwriting pen, the user can record data or calculate on the handwriting pad unit for subsequent calculation or verification using the calculator, making it convenient for the user to use.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
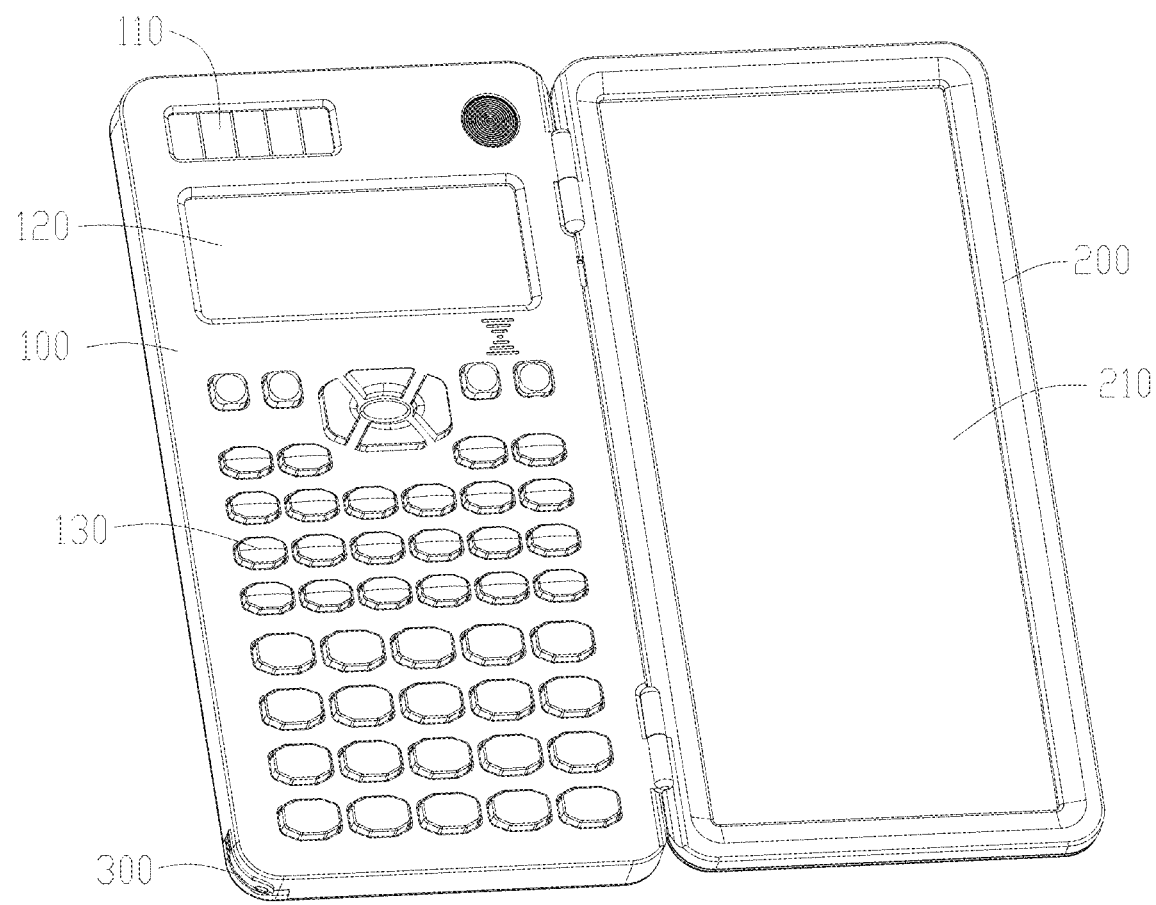
FIG. 1 is an unfolded state diagram of a calculator with a handwriting pad when a handwriting pad unit is rotationally connected to a calculator unit according to the present invention.
Figure 2:
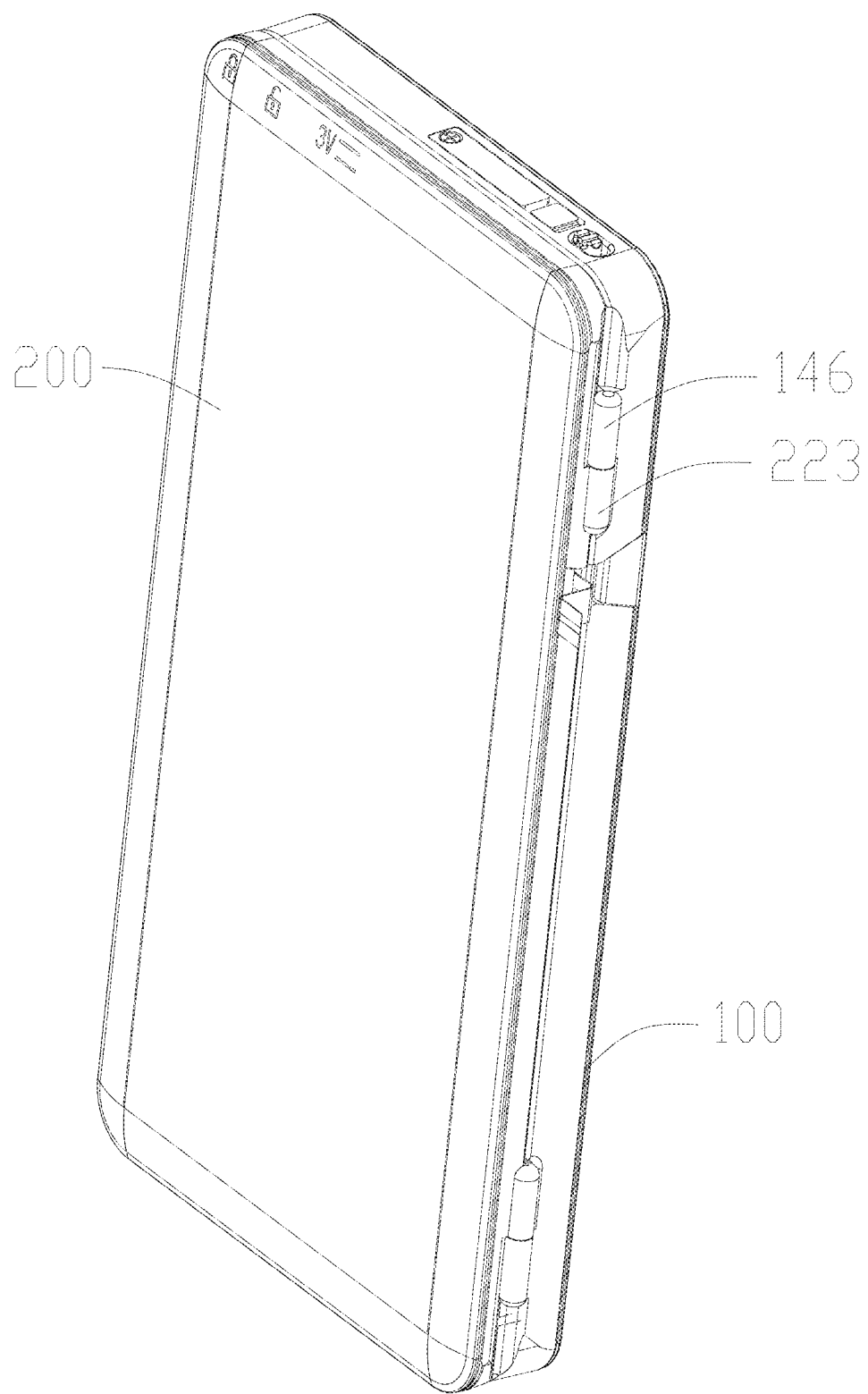
FIG. 2 is a folded state diagram of the calculator with the handwriting pad when the handwriting pad unit is rotationally connected to the calculator unit according to the present invention.
Figure 3:
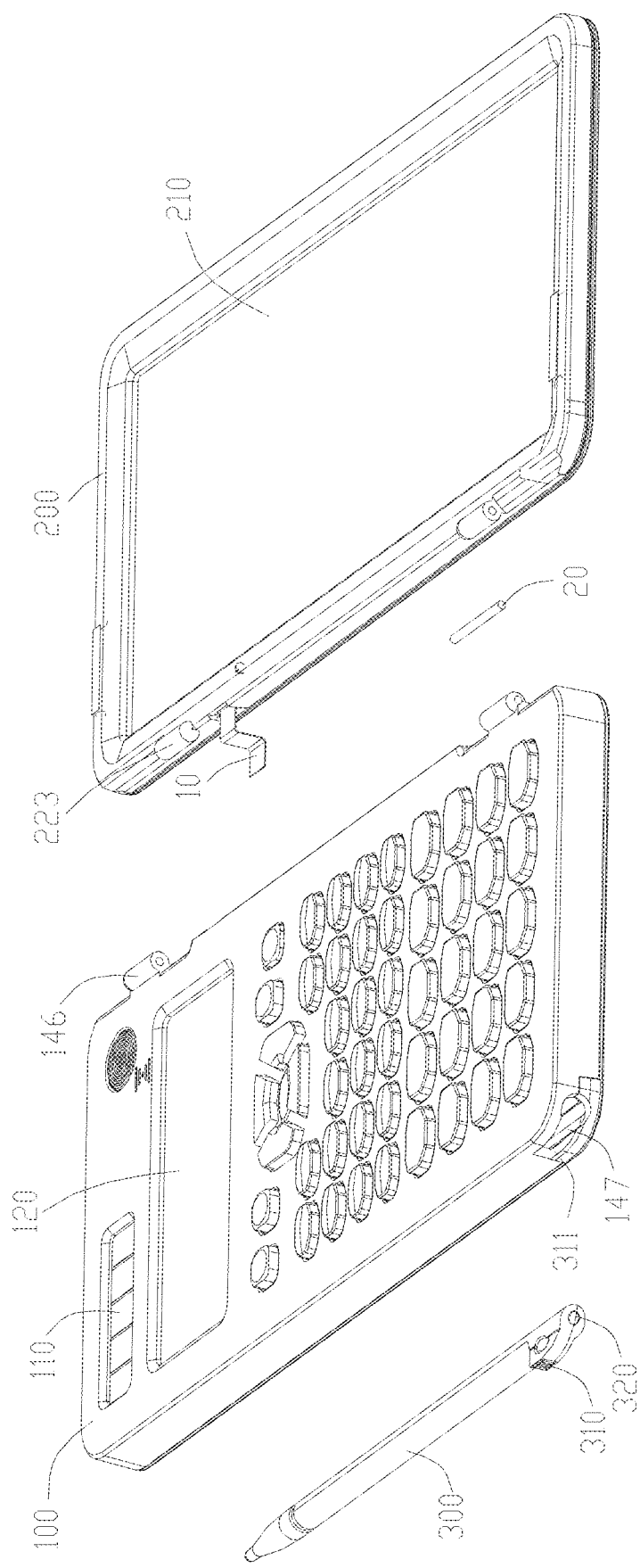
FIG. 3 is an exploded view of the calculator with the handwriting pad when the handwriting pad unit is rotationally connected to the calculator unit according to the present invention.
Figure 4:
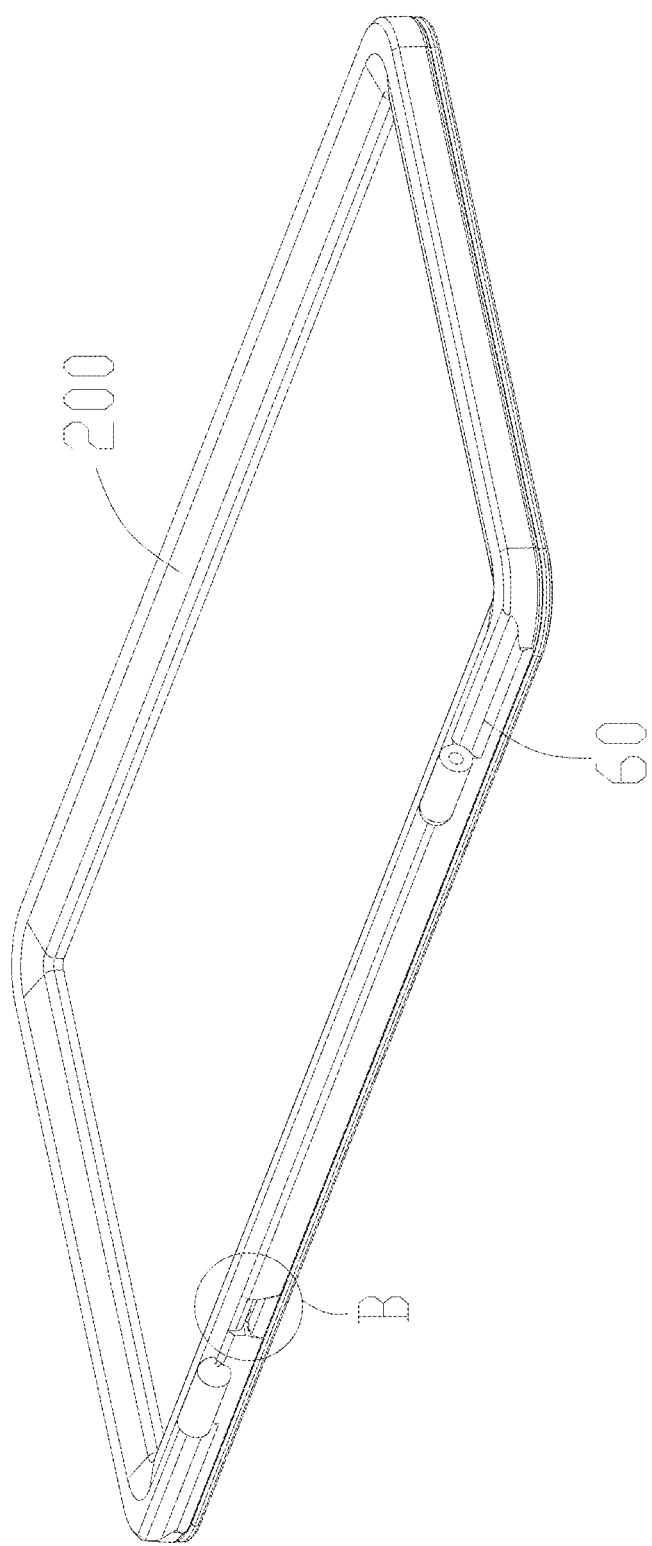
FIG. 4 is a schematic diagram of the handwriting pad unit when the handwriting pad unit is rotationally connected to the calculator unit according to the present invention.
Figure 5:
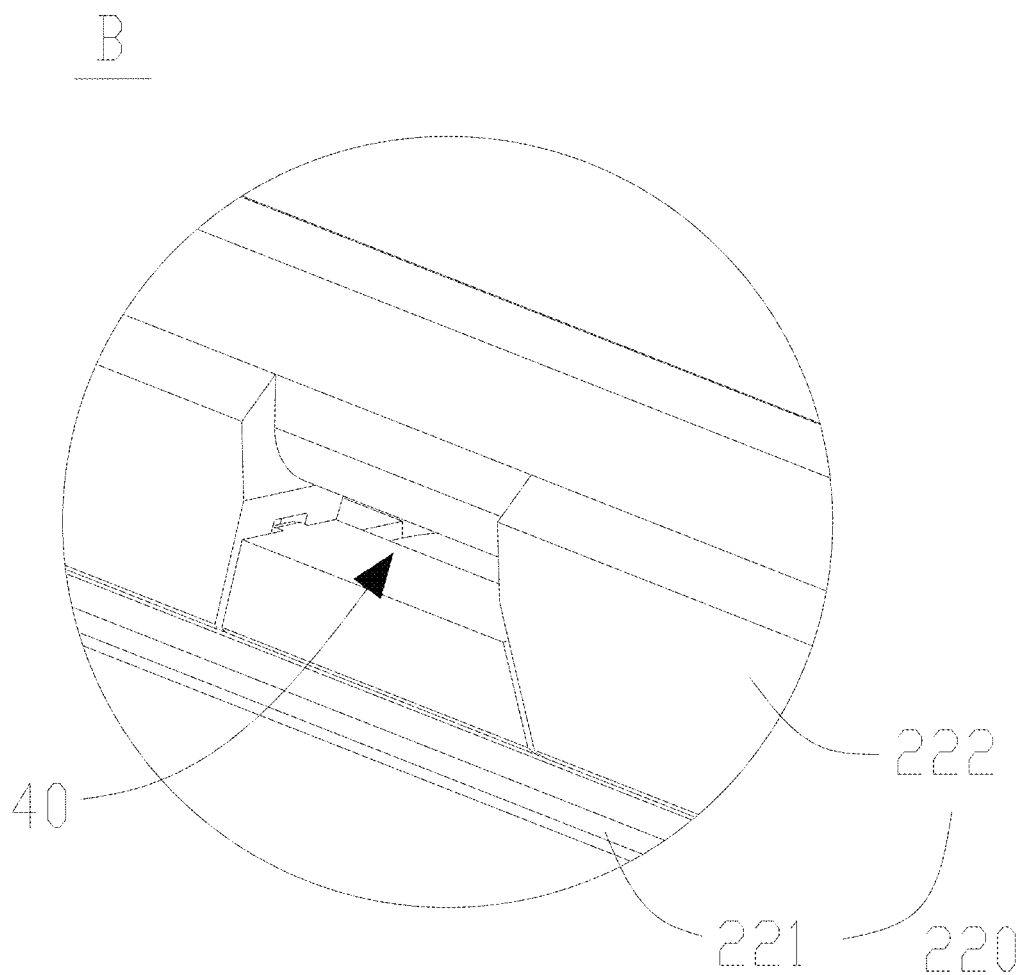
FIG. 5 is an enlarged view of area B in FIG. 4.
Figure 6:
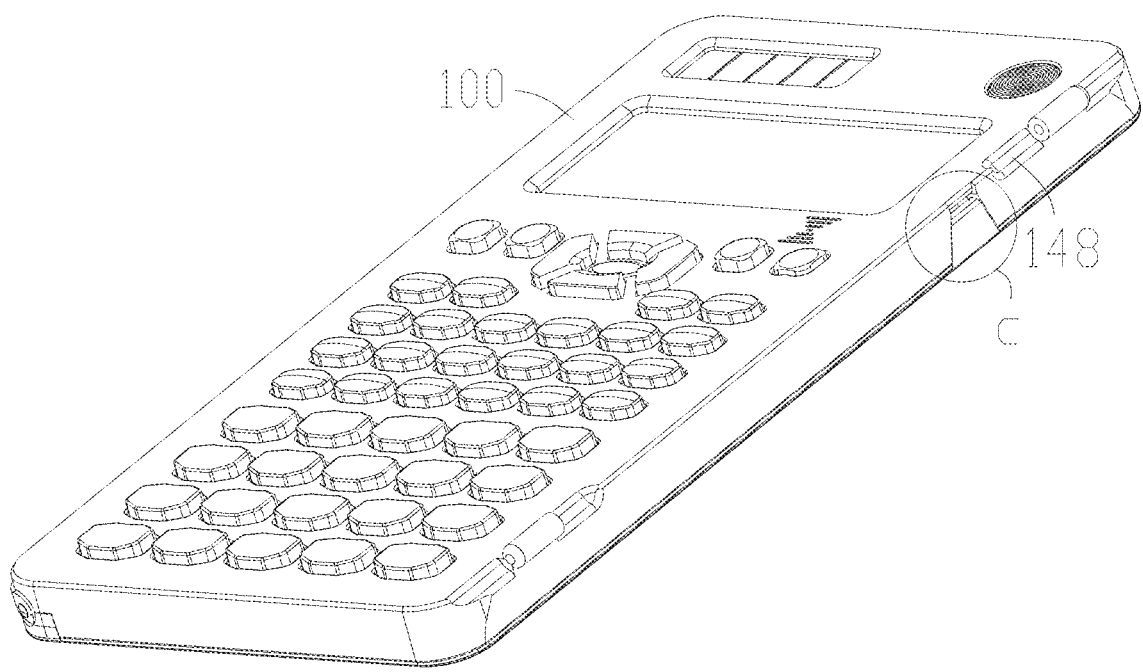
FIG. 6 is a schematic diagram of the calculator unit when the handwriting pad unit is rotationally connected to the calculator unit according to the present invention.
Figure 7:
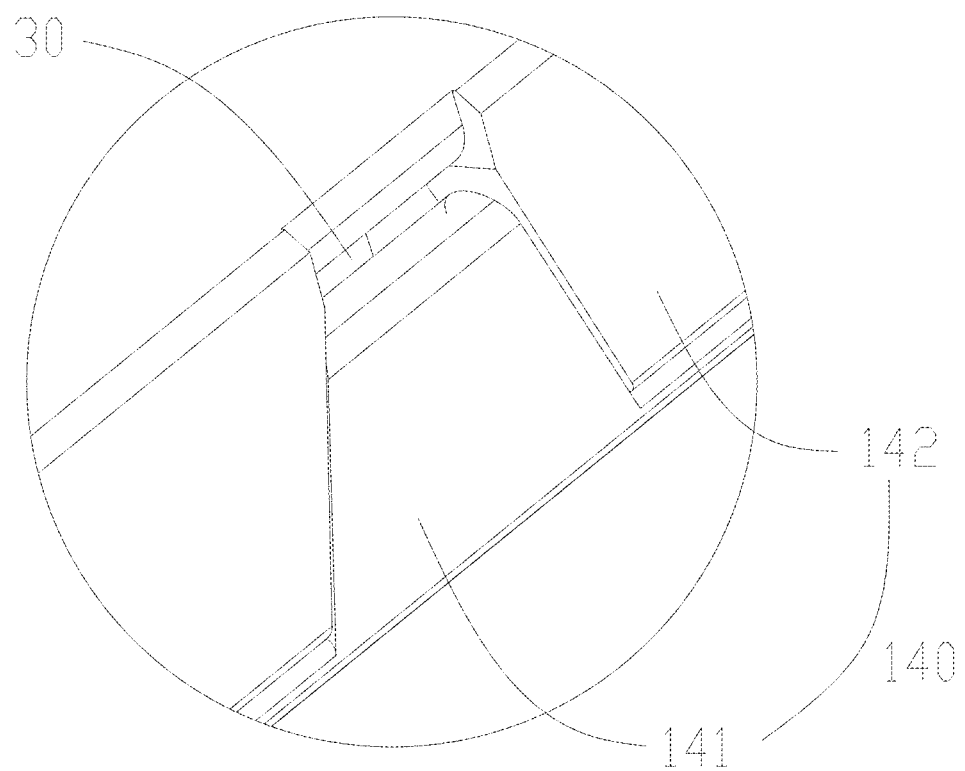
FIG. 7 is an enlarged view of area C in FIG. 6.
Figure 8:
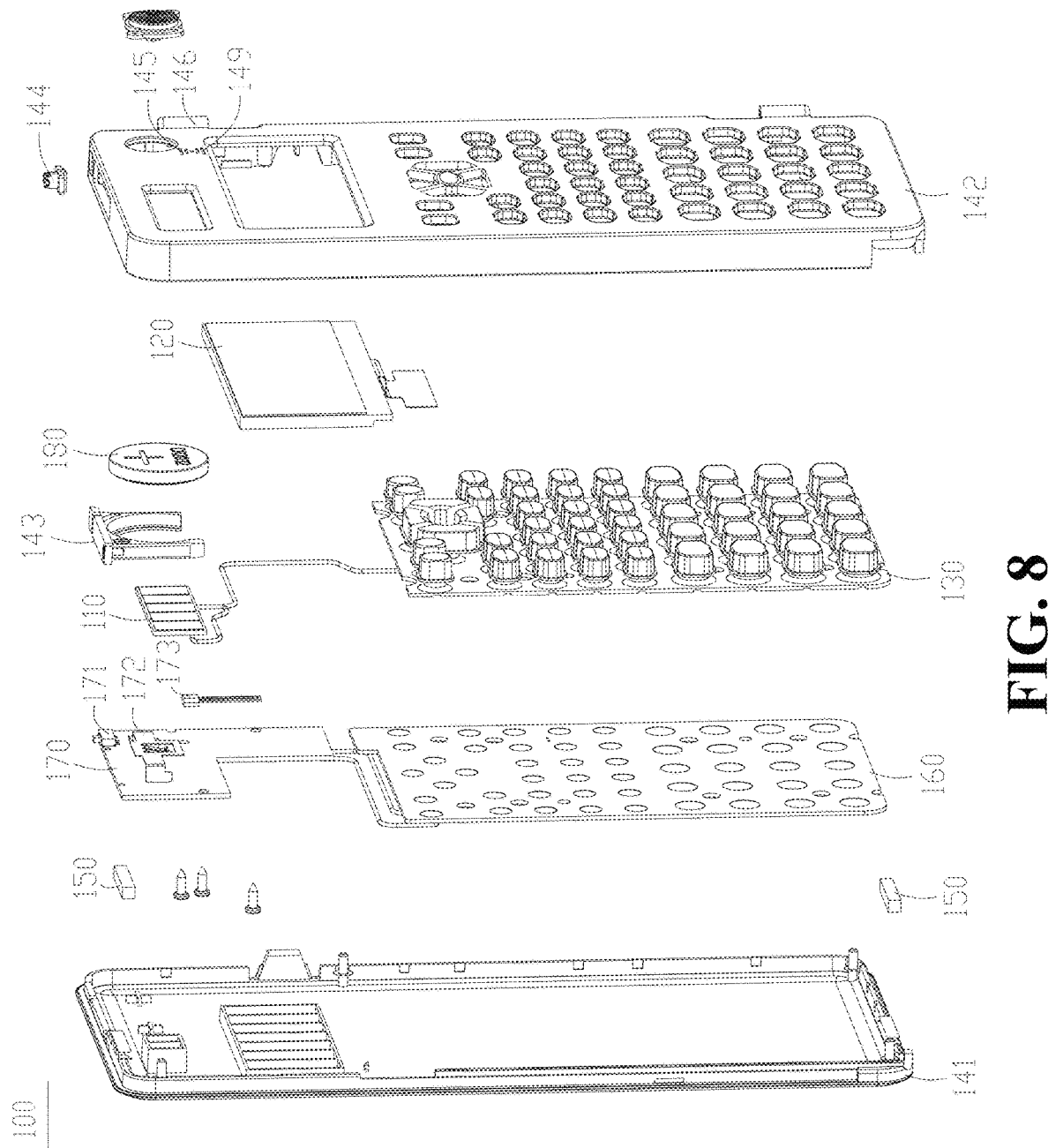
FIG. 8 is an exploded view of the calculator unit when the handwriting pad unit is rotationally connected to the calculator unit according to the present invention.
Figure 9:
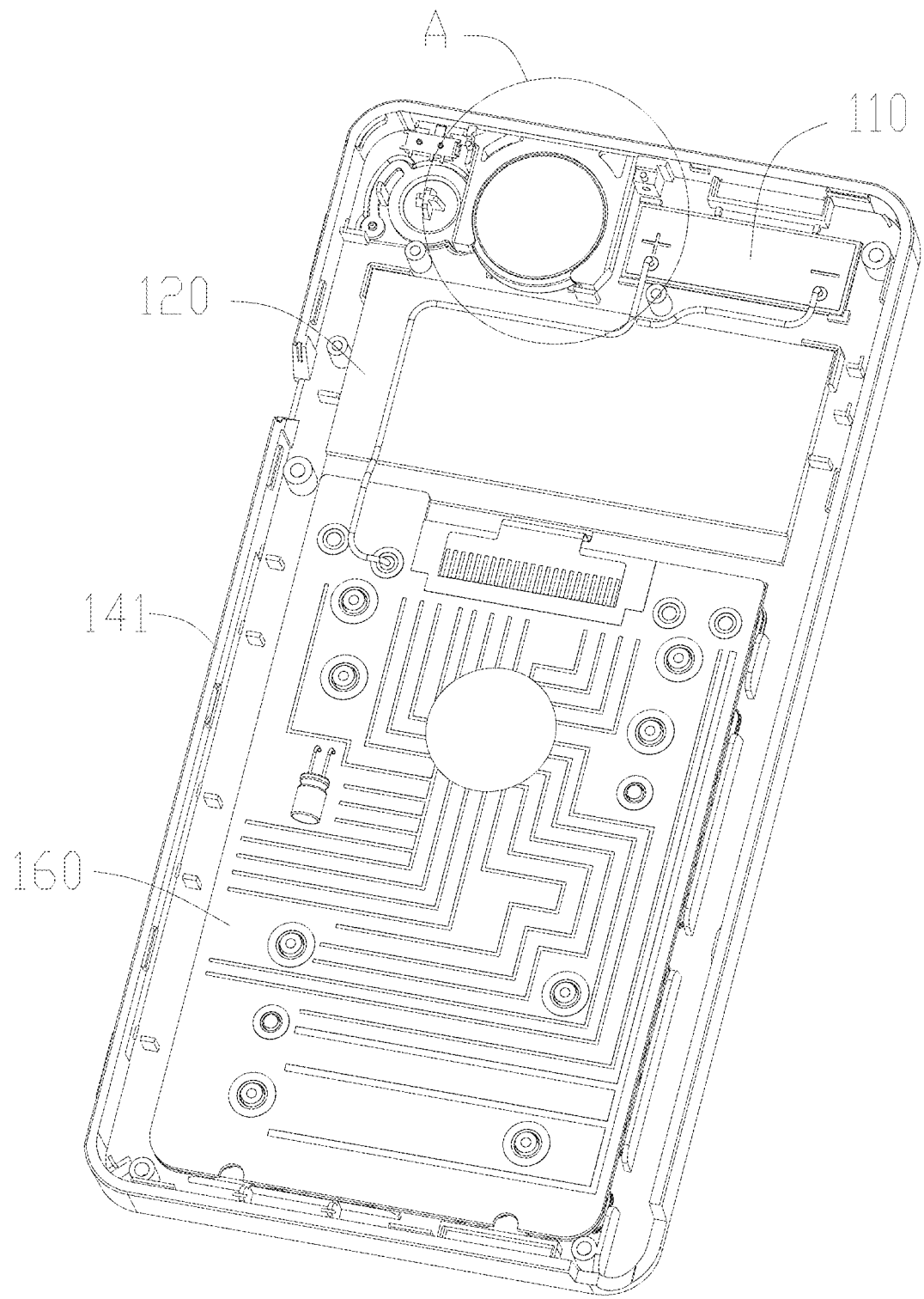
FIG. 9 is a partial internal structure diagram of the calculator unit when the handwriting pad unit is rotationally connected to the calculator unit according to the present invention.
Figure 10:
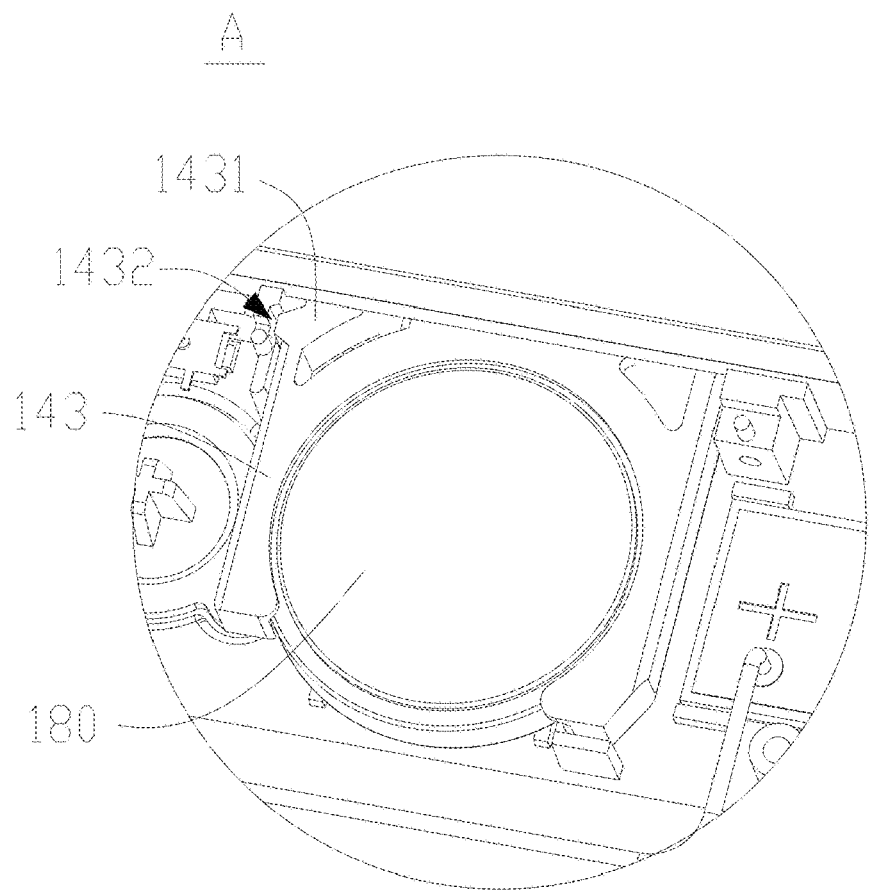
FIG. 10 is an enlarged view of area A in FIG. 9.
Figure 11:
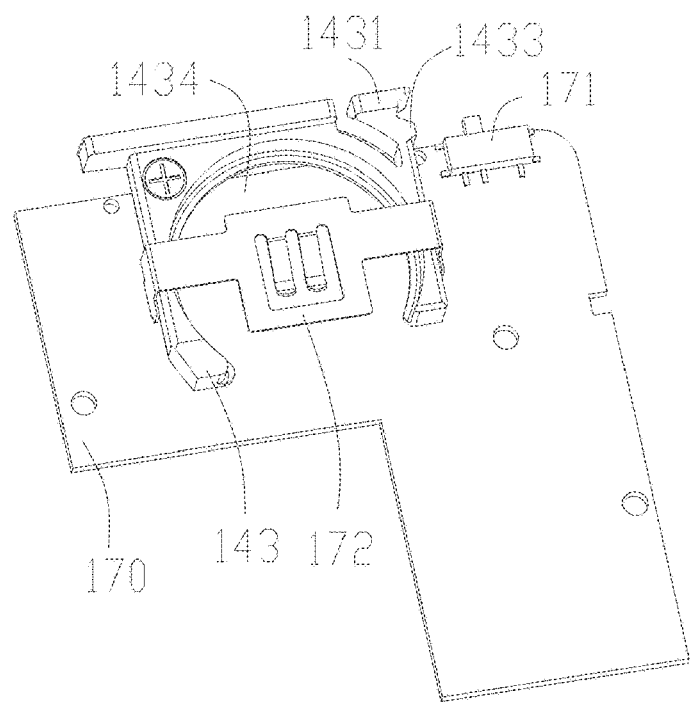
FIG. 11 is an assembled diagram of a first pulling element and a first circuit board when the handwriting pad unit is rotationally connected to the calculator unit according to the present invention.
Figure 12:
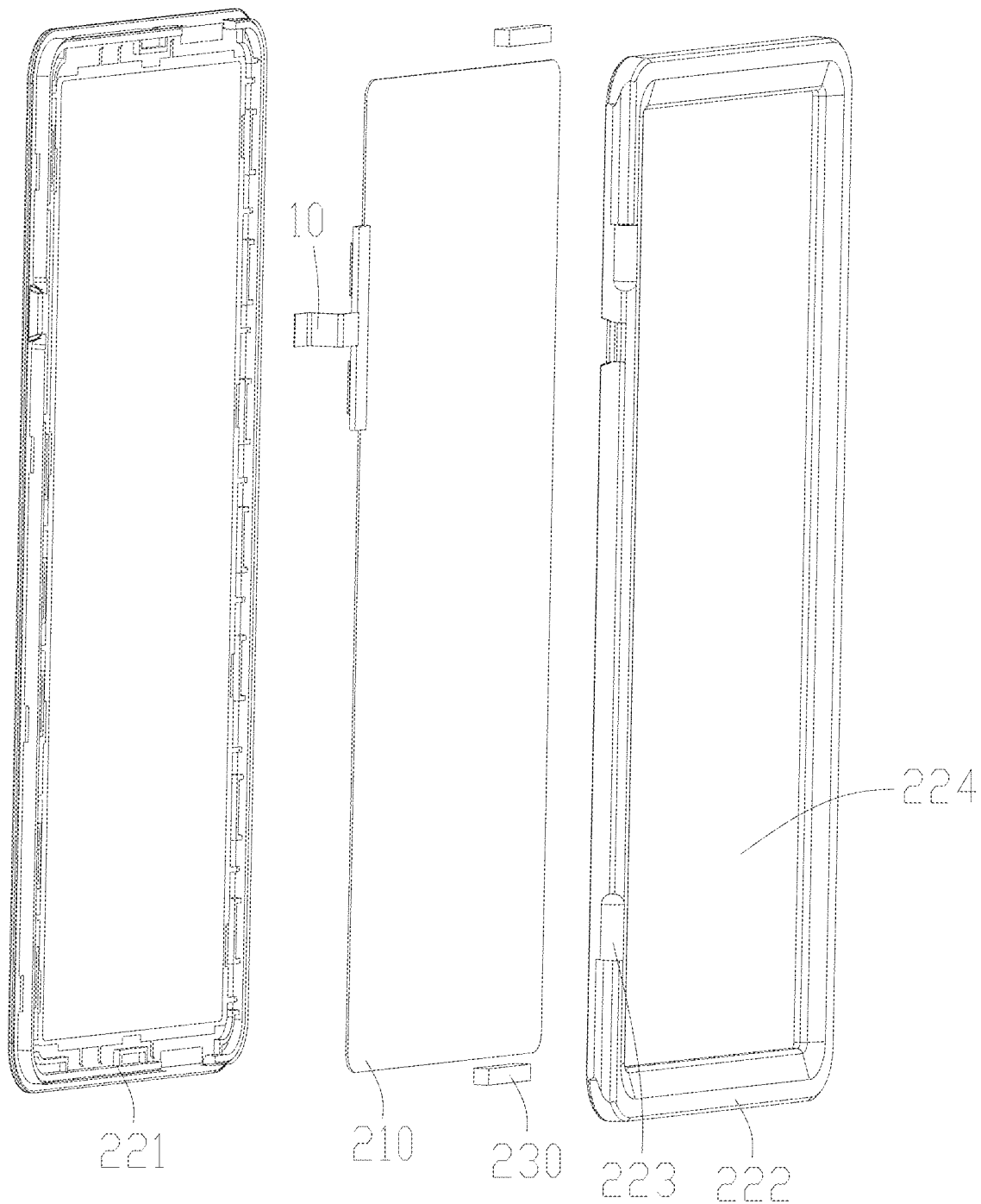
FIG. 12 is an exploded view of the handwriting pad unit when the handwriting pad unit is rotationally connected to the calculator unit according to the present invention.
Figure 13:
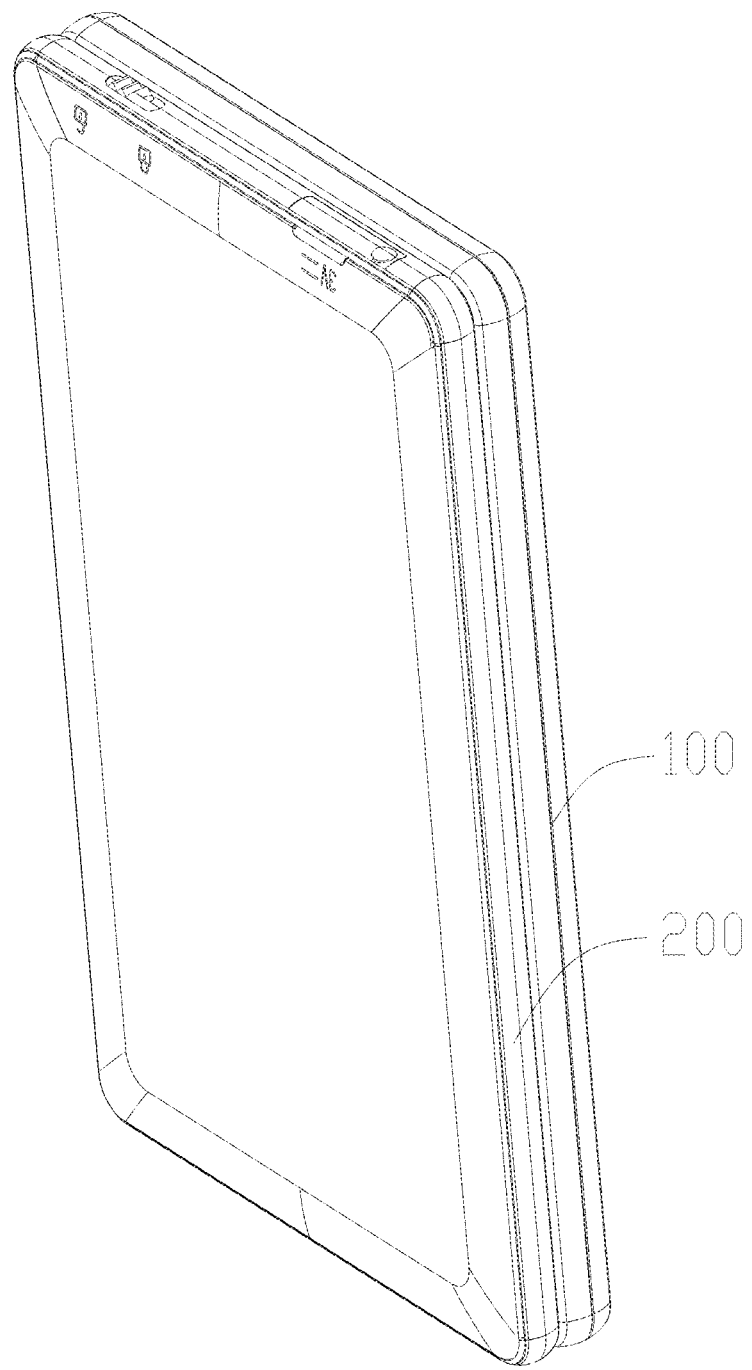
FIG. 13 is a folded state diagram of the calculator with the handwriting pad when the handwriting pad unit and the calculator unit are in magnetic connection according to the present invention.
Figure 14:
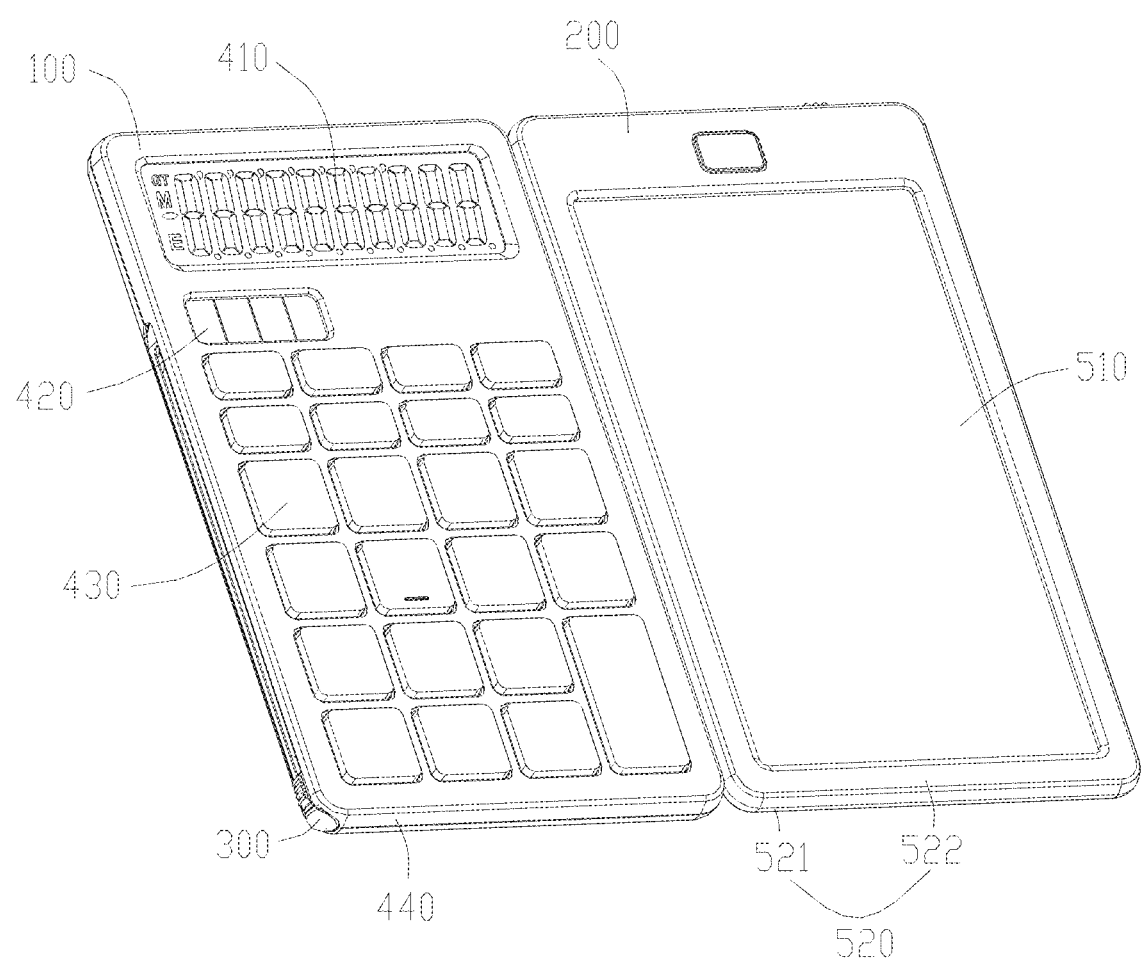
FIG. 14 is an unfolded state diagram of the calculator with the handwriting pad when the handwriting pad unit and the calculator unit are in magnetic connection according to the present invention.
Figure 15:
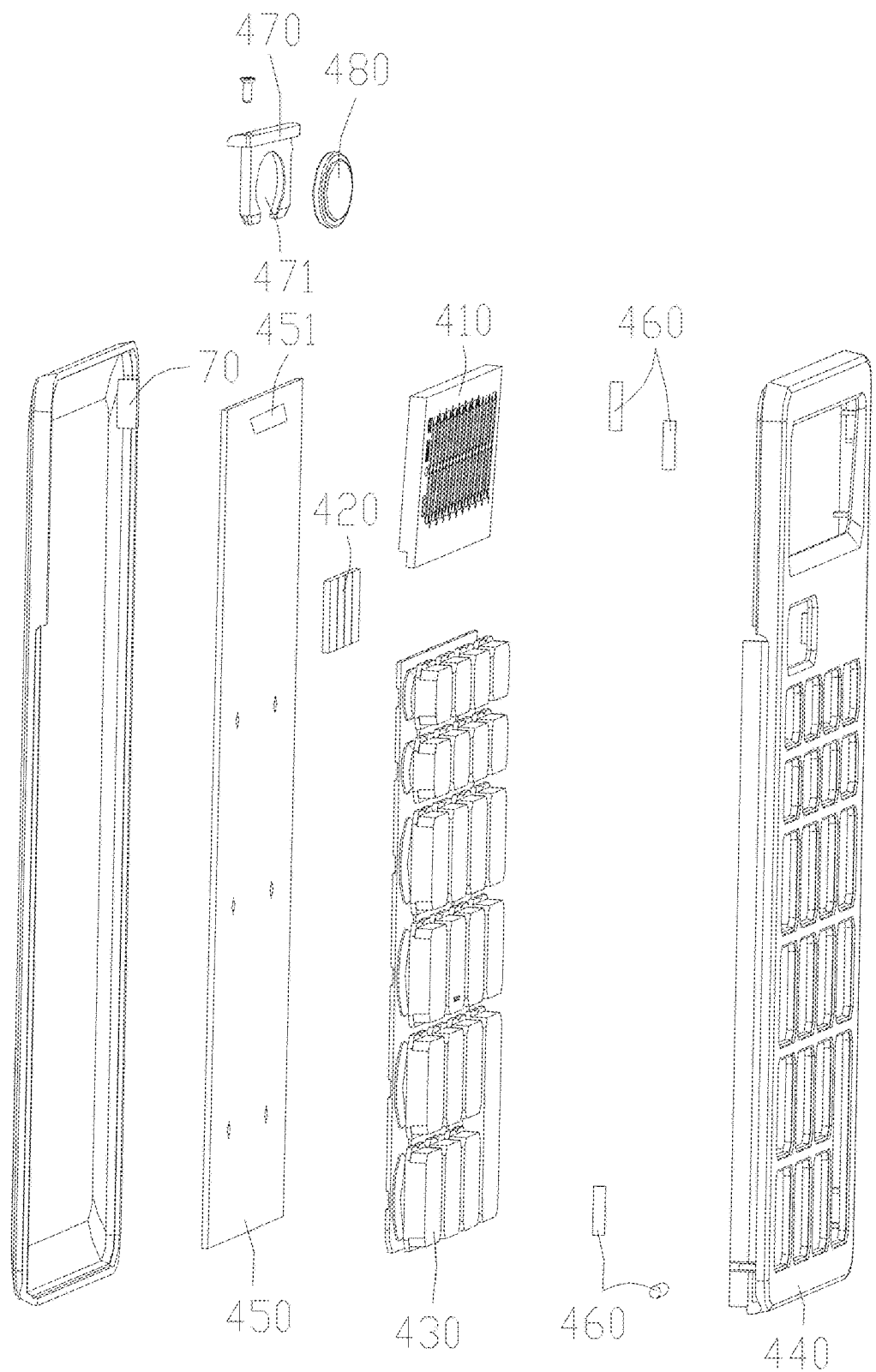
FIG. 15 is an exploded view of the calculator unit when the handwriting pad unit and the calculator unit are in magnetic connection according to the present invention.
Figure 16:
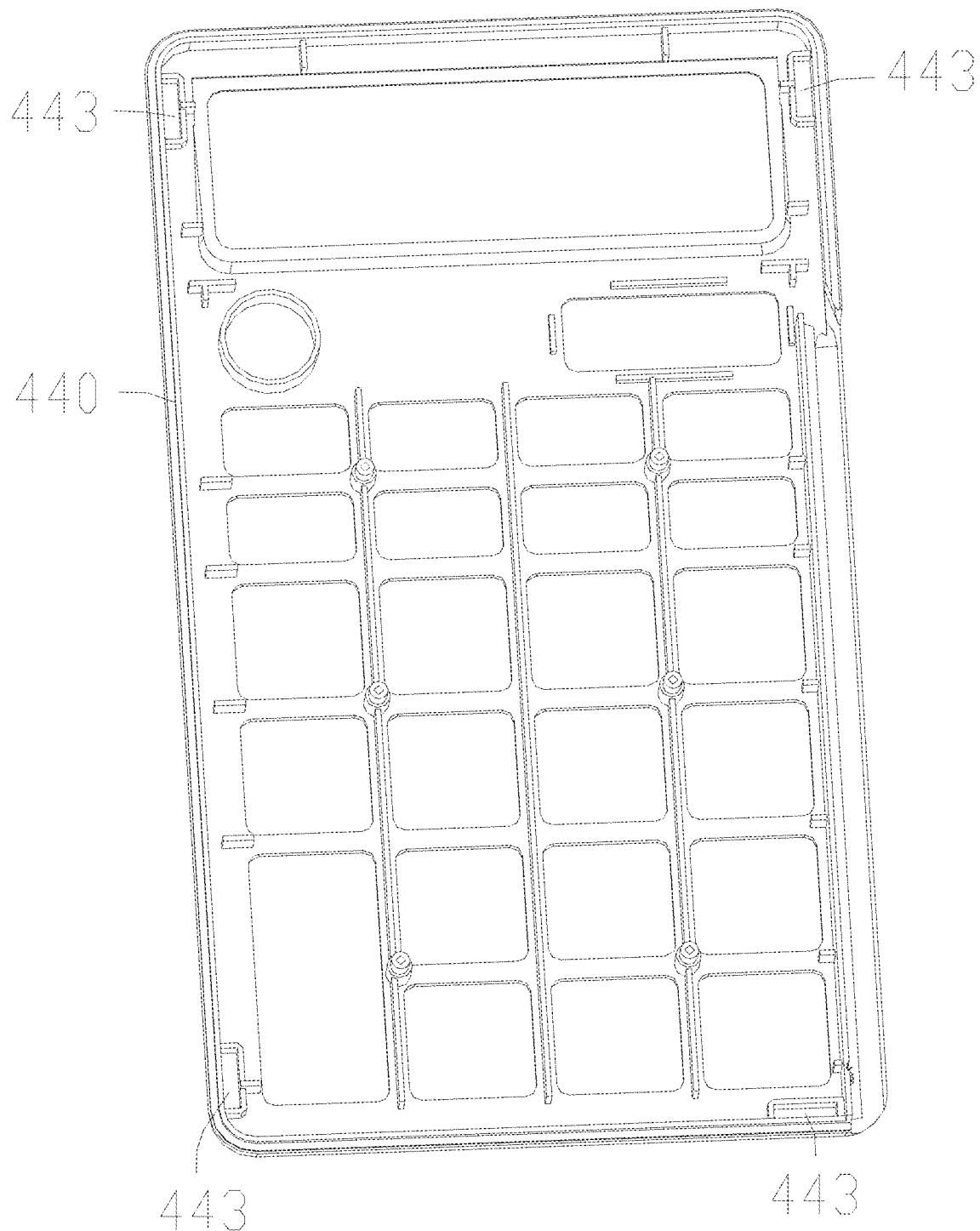
FIG. 16 is a structural diagram of a third front housing on the calculator unit when the handwriting pad unit and the calculator unit are in magnetic connection according to the present invention.
Figure 17:
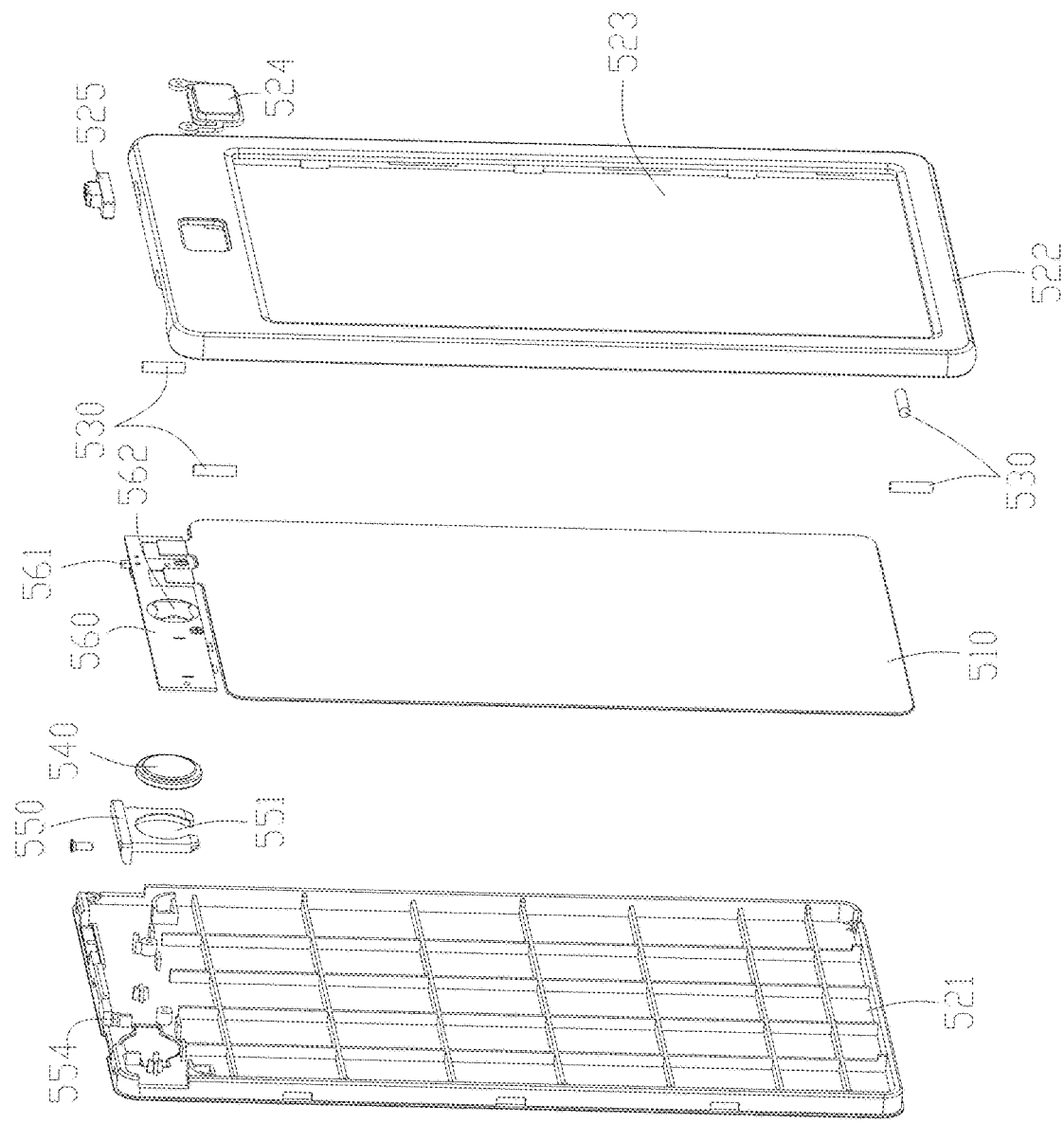
FIG. 17 is an exploded view of the handwriting pad unit when the handwriting pad unit and the calculator unit are in magnetic connection according to the present invention.
Figure 18:
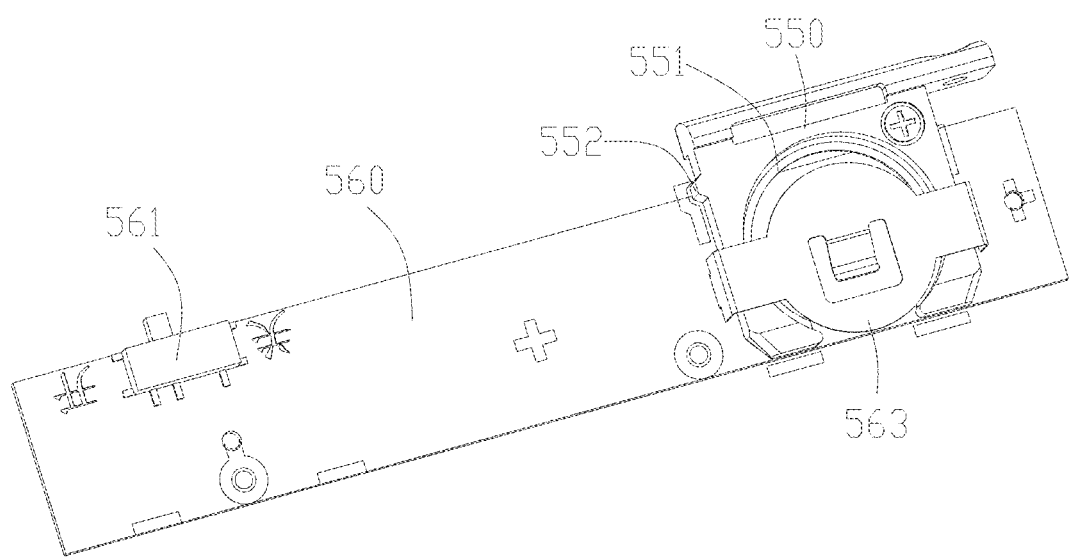
FIG. 18 is an assembled diagram of a third circuit board and a second pulling element when the handwriting pad unit and the calculator unit are in magnetic connection according to the present invention.
Figure 19:
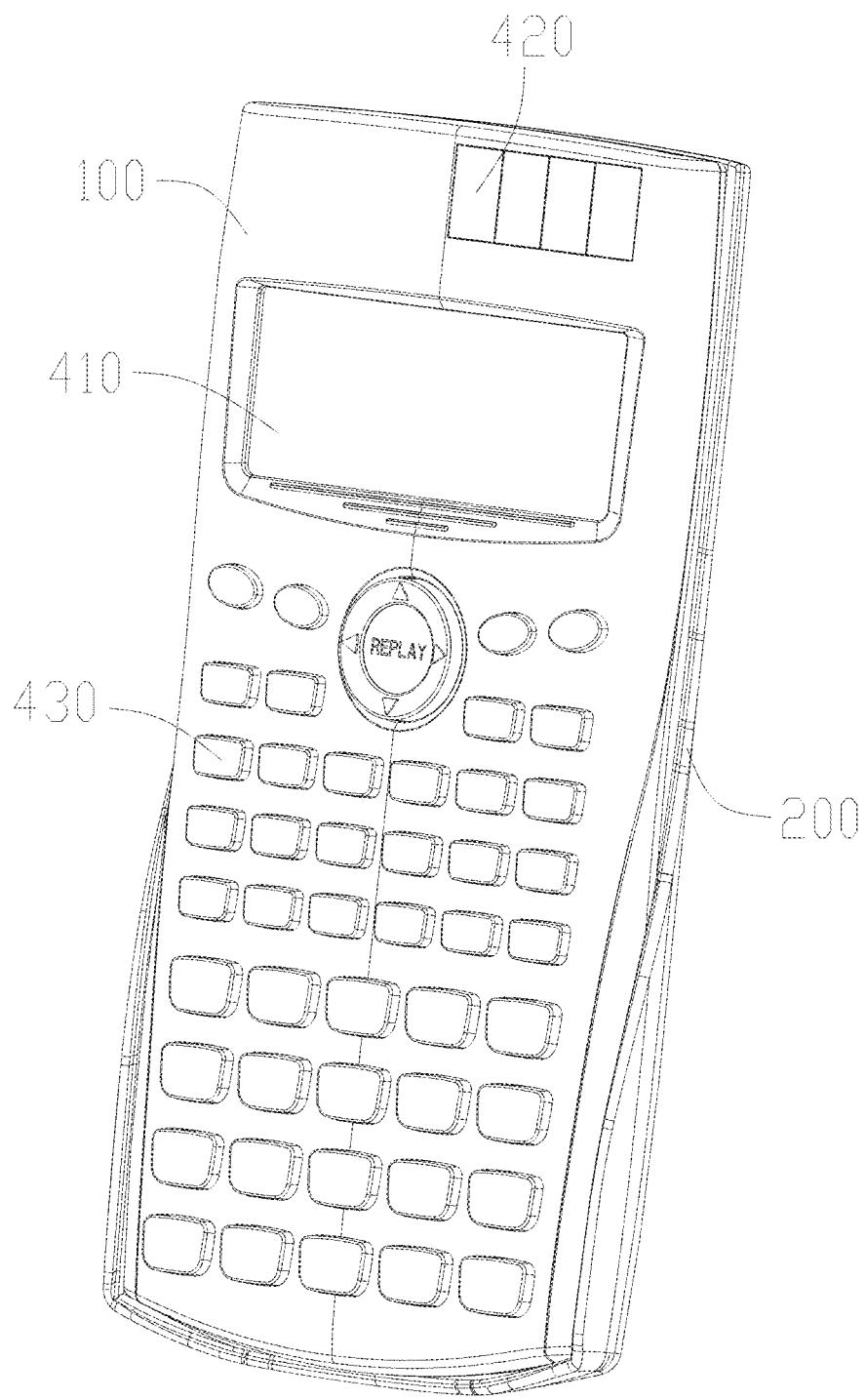
FIG. 19 is a schematic diagram of the handwriting pad unit being positioned on a back surface of the calculator unit when the handwriting pad unit is slidably connected to the calculator unit according to the present invention.
Figure 20:
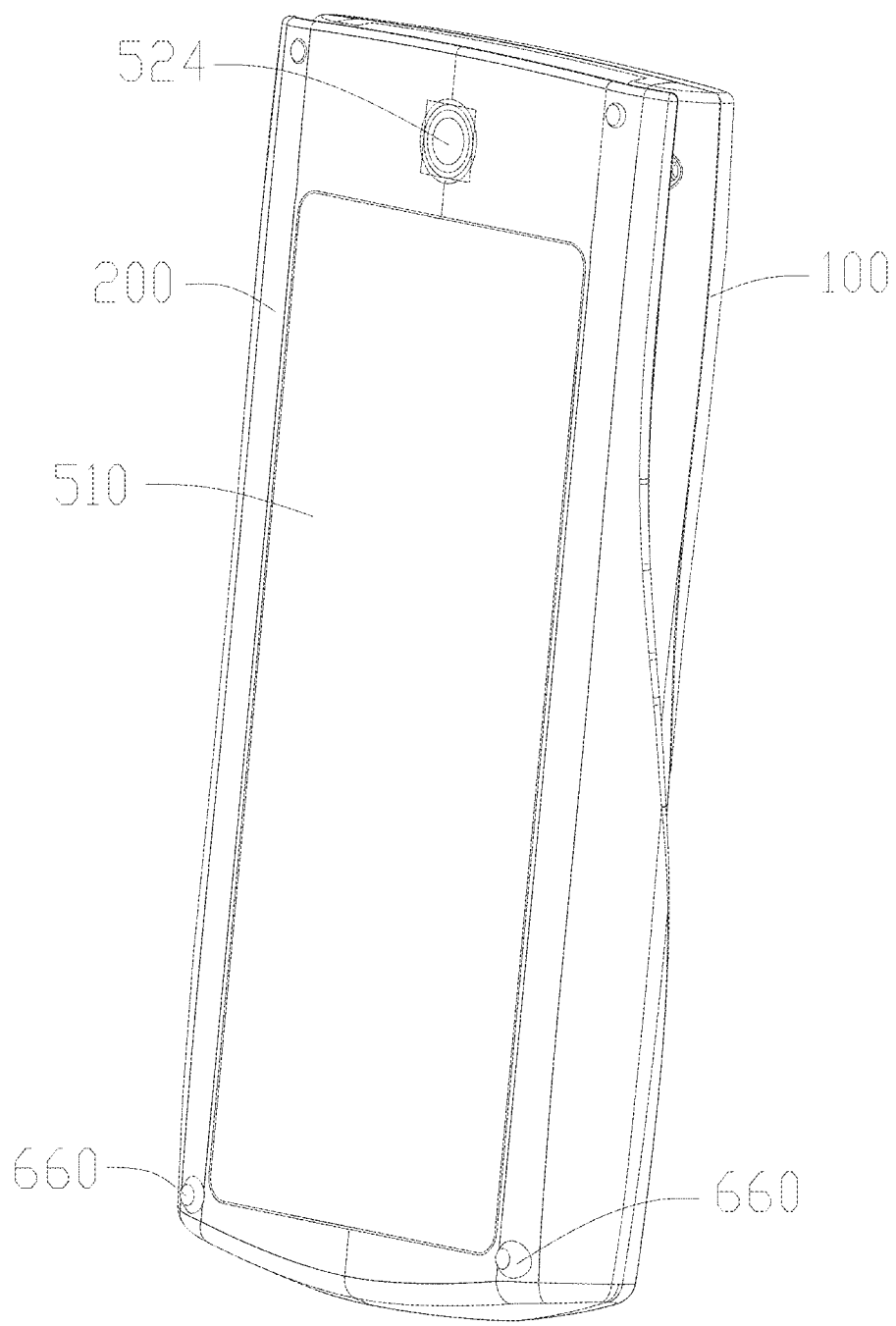
FIG. 20 is a schematic diagram of the handwriting pad unit being positioned in front of the calculator unit when the handwriting pad unit is slidably connected to the calculator unit according to the present invention.
Figure 21:
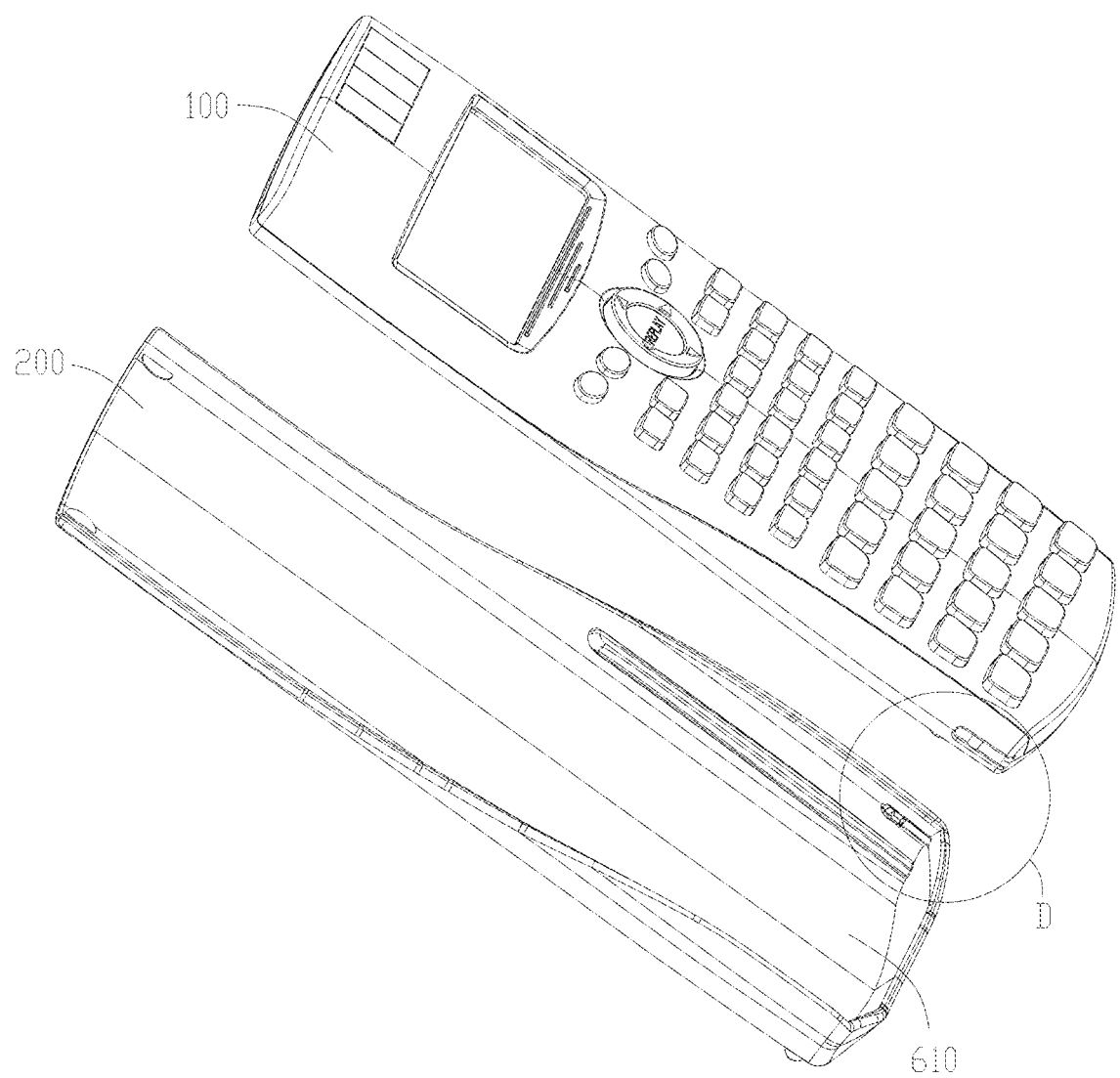
FIG. 21 is an exploded view of the handwriting pad unit and the calculator unit when the handwriting pad unit is slidably connected to the calculator unit according to the present invention.
Figure 22:
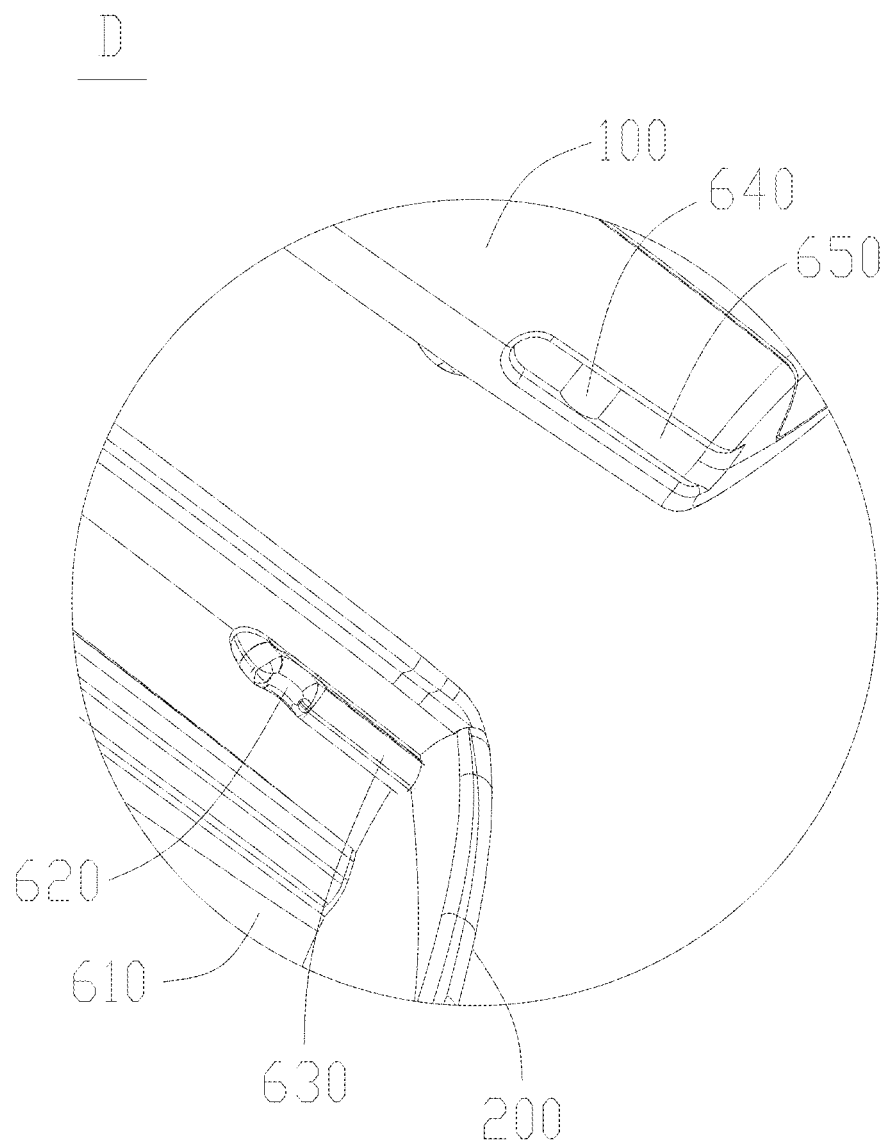
FIG. 22 is an enlarged view of area D in FIG. 21.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

FIGS. 1-28 show a calculator with a handwriting pad according to an embodiment of the present invention.

The calculator with the handwriting pad includes a handwriting pad unit 200, a calculator unit 100, and a handwriting pen 300. The handwriting pen 300 is detachably arranged on the calculator unit 100 or the handwriting pad unit 200, and the handwriting pad unit 200 is connected to the calculator unit 100. When in a storage state, the handwriting pad unit 200 and the calculator unit 100 are arranged in an overlapped manner from up to down. When in an unfolded state, a surface of the handwriting pad unit 200 is horizontally arranged side by side with the calculator unit 100.

In this embodiment, the handwriting pad unit 200, the calculator unit 100, and the handwriting pen 300 are connected together so that the user can directly access them during use without having to search for them one by one. The handwriting pad unit 200 and the calculator unit 100 can be stacked together when not in use, reducing an overall volume and facilitating carrying and storage when going out. Moreover, the handwriting pad unit 200 and calculator unit 100 can be arranged horizontally side by side when in use, and in conjunction with the handwriting pen 300, the user can record data or calculate on the handwriting pad unit 200 for subsequent calculation or verification using the calculator, making it convenient for the user to use.

In practical application, the handwriting pad unit 200 is rotationally connected to the calculator unit 100.

Referring to FIGS. 1-12, specifically, at least one first rotating part 223 is provided on the handwriting pad unit 200, and a second rotating part 146 is provided on the calculator unit 100 for use in conjunction with the first rotating part 223. The first rotating part 223 is connected to the second rotating part 146 through a shaft rod 20 to achieve rotational connection between the handwriting pad unit 200 and the calculator unit 100. The handwriting pad unit 200 and the calculator unit 100 can be folded for placement when not in use, and can be unfolded when in use, so as to facilitate the use's use. Of course, in other embodiments, the handwriting pad unit 200 and the calculator unit 100 can be connected through a hinge, which can also achieve the rotational connection between the handwriting pad unit 200 and the calculator unit 100.

In a preferred embodiment, at least one first magnetic attraction element 150 is provided within the calculator unit 100, and a second magnetic attraction element 230 is provided on the handwriting pad unit 200 for use with the first magnetic attraction element 150. The first magnetic attraction element 150 is attracted with the second magnetic attraction element 230 when the handwriting pad unit 200 and the calculator unit 100 are in the storage state, so as to achieve position fixation when the handwriting pad unit 200 and the calculator unit 100 are folded and placed, preventing the handwriting pad unit 200 and the calculator unit 100 from opening, thereby facilitating storage and carrying. Moreover, other items can be prevented from colliding with a display unit on the handwriting pad unit 200 during the carrying process, thereby playing a role of protection. One of the first magnetic attraction element 150 and the second magnetic attraction element 230 is a magnet and the other is an iron block. Alternatively, both the first magnetic attraction element 150 and the second magnetic attraction element 230 are magnets.

Referring to FIGS. 13-18, in practical application, the handwriting pad unit 200 and the calculator unit 100 can also be connected by magnetic attraction, which also enables the handwriting pad unit 200 and the calculator unit 100 to be folded and placed when not in use, and be unfolded when in use.

Specifically, a plurality of third magnetic attraction elements 530 are provided on the handwriting pad unit 200, and at least one part of the third magnetic attraction elements 530 are positioned near a peripheral side of the handwriting pad unit 200. The calculator unit 100 is equipped with fourth magnetic attraction elements 460, and the fourth magnetic attraction elements 460 are attracted with the third magnetic attraction elements 530. In this way, when the handwriting pad unit 200 and the calculator unit 100 are unfolded and horizontally arranged side by side, the third magnetic attraction elements 530 and the fourth magnetic attraction elements 460 are attracted and fixed to each other. When the handwriting pad unit 200 and the calculator unit 100 are stored and folded, the third magnetic attraction elements 530 and the fourth magnetic attraction elements 460 can also be used to attract with each other to fix a relative position of the handwriting pad unit 200 and the calculator unit 100 to prevent opening. The third magnetic attraction elements 530 are magnets or iron blocks, and the fourth magnetic attraction elements 460 are magnets. Alternatively, the third magnetic attraction elements 530 are magnets, and the fourth magnetic attraction elements 460 are iron blocks.

In a preferred embodiment, a total number of the third magnetic attraction elements 530 and a total number of the fourth magnetic attraction elements 460 are both four. The four third magnetic attraction elements 530 are respectively arranged near four end corners of the handwriting pad unit 200. Both the third magnetic attraction elements 530 and the fourth magnetic attraction elements 460 are in a long strip shape, so as to enhance the magnetic attraction force of the third magnetic attraction elements 530 and the fourth magnetic attraction element 460.

In this embodiment, three of the third magnetic attraction elements 530 are arranged along a lengthwise direction of the calculator unit 100, and one of the third magnetic attraction elements 530 is arranged along a width direction of the calculator unit 100. Of course, in other embodiments, all the four third magnetic attraction elements 530 can be arranged along the lengthwise direction or the width direction of the calculator unit 100.

Referring to FIGS. 19-22, in practical application, the handwriting pad unit 200 and the calculator unit 100 can also be connected by sliding, which also enables the handwriting pad unit 200 and the calculator unit 100 to be folded and placed when not in use, and unfolded when in use.

Specifically, a sliding slot 610 is provided on a back surface of the handwriting pad unit 200 for accommodating the calculator unit 100. When in the storage state, the calculator unit 100 is placed inside the sliding slot 610, achieving sliding setting between the calculator unit 100 and the handwriting pad unit 200. That is, the handwriting pad unit 200 can serve as a sliding cover. When the calculator unit 100 is in use, the sliding cover is placed on the back surface of the calculator unit 100. When the calculator unit 100 is not in use, the sliding cover serves as a protective cover and is placed in front of the calculator unit 100, playing a role of protecting the calculator unit 100.

In a preferred embodiment, a position limiting convex bar 630 is provided on a side wall of the sliding slot 610, and a second fixing slot 620 is provided on the position limiting convex bar 630. A position limiting slot 650 is provided on a side wall of the calculator unit 100 for use in conjunction with the position limiting convex bar 630. The position limiting slot 650 is positioned near an end of the calculator. A second fixing block 640 is provided on the position limiting slot 650 for use in conjunction with the second fixing slot 620. When in the storage state, the position limiting convex bar 630 is placed in the position limiting slot 650, and the second fixing block 640 is placed in the second fixing slot 620, so as to fix a relative position of the calculator unit 100 and the handwriting pad unit 200. When the user needs to use both the handwriting pad unit 200 and the calculator unit 100 at the same time, the calculator unit 100 can be pulled out to separate from the handwriting pad unit 200, so that the handwriting pad unit 200 and the calculator unit 100 can be arranged horizontally side by side.

In a preferred embodiment, the handwriting pad unit 200 protrudes outward on one side away from the sliding slot 610 to form a supporting convex block 660. Therefore, when the sliding cover is placed on the back surface of the calculator unit 100, the supporting convex block 660 can support the entire product, preventing a surface of the handwriting pad unit 200 from directly contacting a placement surface, thereby preventing the surface of the handwriting pad unit 200 from being scratched, paying a role of protection.

Figure 23:
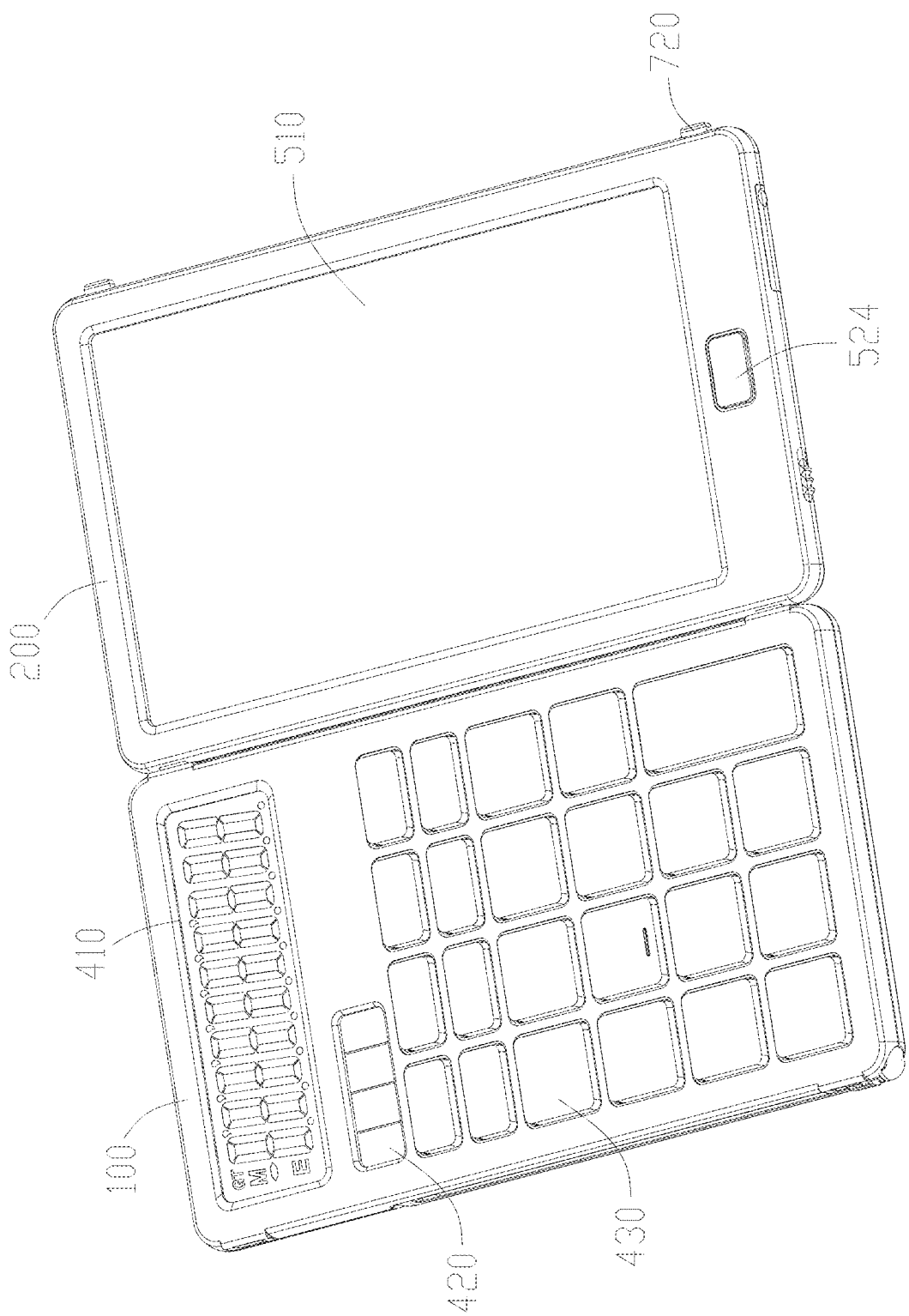
FIG. 23 is an unfolding schematic diagram of the calculator with the handwriting pad when the handwriting pad unit is connected to the calculator unit in a buckle manner according to the present invention.
Figure 24:
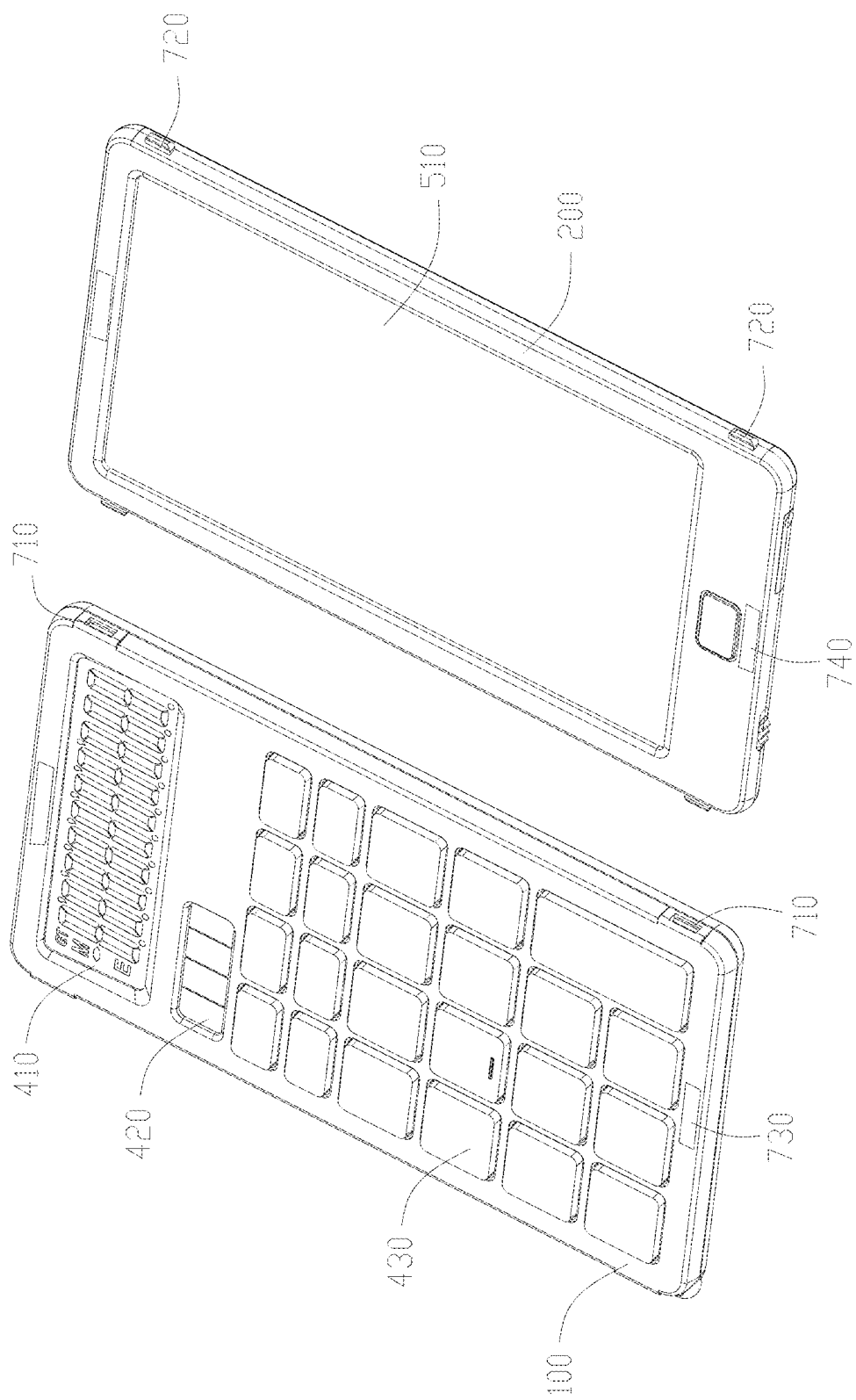
FIG. 24 is an exploded view of the handwriting pad unit and the calculator unit when the handwriting pad unit is connected to the calculator unit in a buckle manner according to the present invention.
Figure 25:
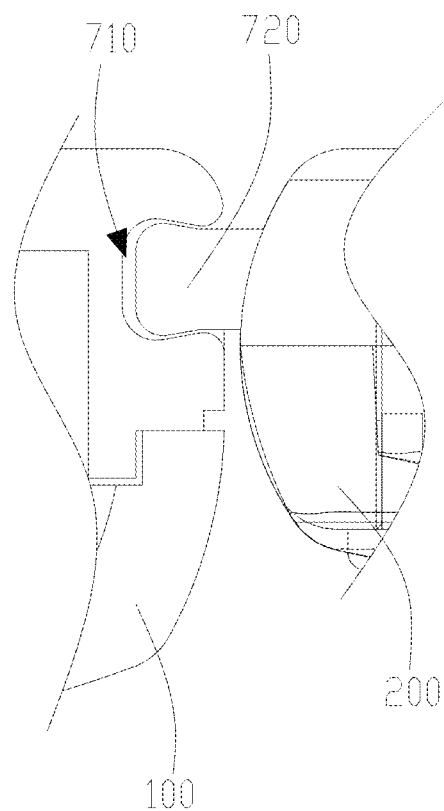
FIG. 25 is a schematic diagram of a connecting fixing block being placed in a fourth fixing slot when the handwriting pad unit is connected to the calculator unit in a buckle manner according to the present invention.

Referring to FIGS. 23-25, in practical application, the handwriting pad unit 200 and the calculator unit 100 can also be connected in a buckle form, which can also achieved that the handwriting pad unit 200 and the calculator unit 100 can be folded and placed when not in use, and unfolded when in use.

Specifically, one side wall of the handwriting pad unit 200 is equipped with connecting fixing blocks 720, and one side wall of the calculator unit 100 is equipped with fourth fixing slots 710 for use in conjunction with the connecting fixing blocks 720. The connecting fixing blocks 720 are placed inside the fourth fixing slots 710 when the handwriting pad unit 200 is connected to the calculator unit 100. The handwriting pad unit 200 is equipped with a fifth magnetic attraction element 740. The calculator unit 100 is equipped with a sixth magnetic attraction element 730. The fifth magnetic attraction element 740 is attracted with the sixth magnetic attraction element 730 when the handwriting pad unit 200 and the calculator unit 100 are stored.

When the handwriting pad unit 200 and the calculator unit 100 are in use, the connecting fixing blocks 720 are placed in the fourth fixing slots 710, so that the handwriting pad unit 200 and the calculator unit 100 are connected to each other and are arranged horizontally side by side. Moreover, when the handwriting pad unit 200 and calculator unit 100 are stored, the fifth magnetic attraction element 740 is attracted with the sixth magnetic attraction element 730 to achieve fixation during folding.

One of the fifth magnetic attraction element 740 and the sixth magnetic attraction element 730 is a magnet and the other is an iron block. Alternatively, both the fifth magnetic attraction element 740 and the sixth magnetic attraction element 730 are magnets. Of course, in other embodiments, the connecting fixing blocks 720 can also be provided on side walls of the calculator unit 100, and the fourth fixing slots 710 can be defined in the handwriting pad unit 200, etc.

In one embodiment, a total number of the connecting fixing blocks 720 is four. Two of the connecting fixing blocks 720 are respectively configured on two opposite side walls of the handwriting pad unit 200. Correspondingly, a total number of the fourth fixing slots 710 is also four, and each of the fourth fixing slots 710 is arranged corresponding to a position of one of the connecting fixing blocks 720 to adapt to a usage habit of left-handed writing.

In the above embodiments, when the handwriting pad unit 200 is connected to the calculator unit 100 through rotation, magnetic attraction, buckle, sliding, and other methods, a power supply can be configured only on the calculator unit 100, and the handwriting pad unit 200 is electrically connected to the calculator unit 100 to achieve power supply to the handwriting pad unit 200. A separate power supply can also be configured in both the handwriting pad unit 200 and the calculator unit 100.

Referring to FIGS. 1-12, in an embodiment where a power supply is configured on the calculator unit 100 and a power supply is not configured on the handwriting pad unit 200, the calculator with the handwriting pad further includes a flexible connection wire 10.

The calculator unit 100 is equipped with a first circuit board 170 and a first clear switch 173 electrically connected to the first circuit board 170. The handwriting pad unit 200 is equipped with a first liquid crystal display (LCD) screen 210. The calculator unit 100 is provided with a first wiring hole 30 on one side near the handwriting pad unit 200. The handwriting pad unit 200 is provided with a second wiring hole 40 on one side near the calculator unit 100. The flexible connection wire 10 passes through the first wiring hole 30 and the second wiring hole 40. One end of the flexible connection wire 10 is placed inside the calculator unit 100 and soldered to the first circuit board 170, and an opposite end of the flexible connection wire 10 is placed inside the handwriting pad unit 200 and soldered to the first LCD screen 210, thereby electrically connecting the handwriting pad unit 200 to the calculator unit 100. When the first clear switch 173 is operated, an electrical signal will be fed back to the first circuit board 170. The first circuit board 170 will clear the content displayed on the first LCD screen 210 through the flexible connection wire 10.

The calculator unit 100 is equipped with a first battery 180, a second circuit board 160, a first display 120, and a first button module group 130. The first circuit board 170 and the first display 120 are both electrically connected to the second circuit board 160, and the first battery 180 is electrically connected to the first circuit board 170, so as to provide power to the first circuit board 170. The power is also supplied to the second circuit board 160 through the first circuit board 170, and to the first LCD screen 210 through the first circuit board 170 and the flexible connection wire 10. The first battery 180, the first circuit board 170, and the first display 120 are all positioned above the second circuit board 160, so that the layout is reasonable, and a volume of the calculator unit 100 can be effectively reduced. The second circuit board 160 performs a calculation on input data when the first button module group 130 is operated, so as to achieve a function of the calculator unit 100 and facilitate the user's operation and calculation.

In one embodiment, the calculator unit 100 is further equipped with a first locking switch 171 electrically connected to the first circuit board 170. When the first circuit board 170 receives an electrical signal fed back by the first locking switch 171, the first circuit board 170 locks the content displayed on the first LCD screen 210 through the flexible connection wire 10, so as to prevent the user from clearing the content on the first LCD screen 210 when accidentally operating the first clear switch 173.

In one embodiment, a side wall of the first wiring hole 30 and/or a side wall of the second wiring hole 40 along a lengthwise direction are/is smooth curved surface(s). Therefore, when the handwriting pad unit 200 and the calculator unit 100 are rotated, friction and creases on the flexible connection wire 10 can be effectively reduced, and a service life of the flexible connection wire 10 can be extended.

In one embodiment, a total sum of a distance between a bottom surface of the first circuit board 170 and the first wiring hole 30, a width of the first wiring hole 30, a distance between the first wiring hole 30 and the second wiring hole 40, a width of the second wiring hole 40, and a distance between the second wiring hole 40 and the first LCD screen 210 is a first length. After a part welded to the first circuit board 170 and a part welded to the first LCD screen 210 are deducted from the flexible connection wire 10, a remaining length of the flexible connection wire 10 is greater than the first length. Therefore, when the handwriting pad unit 200 rotates relative to the calculator unit 100, the flexible connection wire 10 is not folded at a position along a single line, but with a certain area, thereby further improving the service life of the flexible connection wire 10. Specifically, after the part welded to the first circuit board 170 and the part welded to the first LCD screen 210 are deducted from the flexible connection wire 10, the remaining length of the flexible connection wire 10 is 1 mm longer than the first length.

In one embodiment, the first clear switch 173 is a Hall switch. An end of the handwriting pen 300 is provided with a magnetic field magnet 320 for generating a magnetic field. When the first circuit board 170 receives an electrical signal fed back by the Hall switch, the content displayed on the first LCD screen 210 is cleared through the flexible connection wire 10. Therefore, when the user needs to clear the content on the first LCD screen 210, the end of the handwriting pen 300 can be placed close to the Hall switch.

In one embodiment, the calculator unit 100 is equipped with a first photovoltaic panel 110. The first photovoltaic panel 110 is electrically connected to the second circuit board 160. The first battery 180 is a rechargeable battery. The first photovoltaic panel 110 is configured for converting light energy into electrical energy and transmitting the electrical energy to the second circuit board 160. The second circuit board 160 is configured for processing the electrical energy transmitted by the first photovoltaic panel 110 and then storing the electrical energy into the first battery 180 through the first circuit board 170, thereby saving resources.

Specifically, the first photovoltaic panel 110 can be positioned between the first display 120 and the first button module group 130, or the first photovoltaic panel 110 can also be positioned on one side of the first display 120 away from the first button module group 130.

Figure 26:
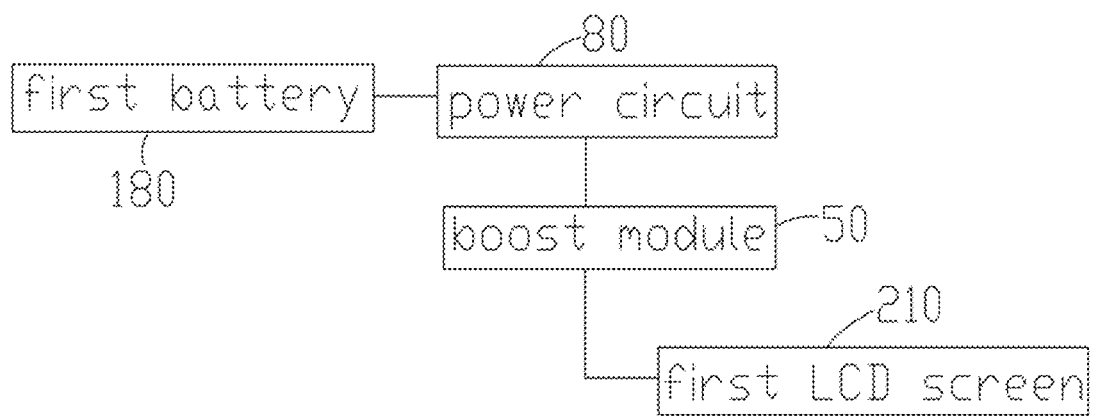
FIG. 26 is a principle block diagram of the electrical connection between a first battery, a power circuit, a boost module, and a first LCD screen according to the present invention.
Figure 27:
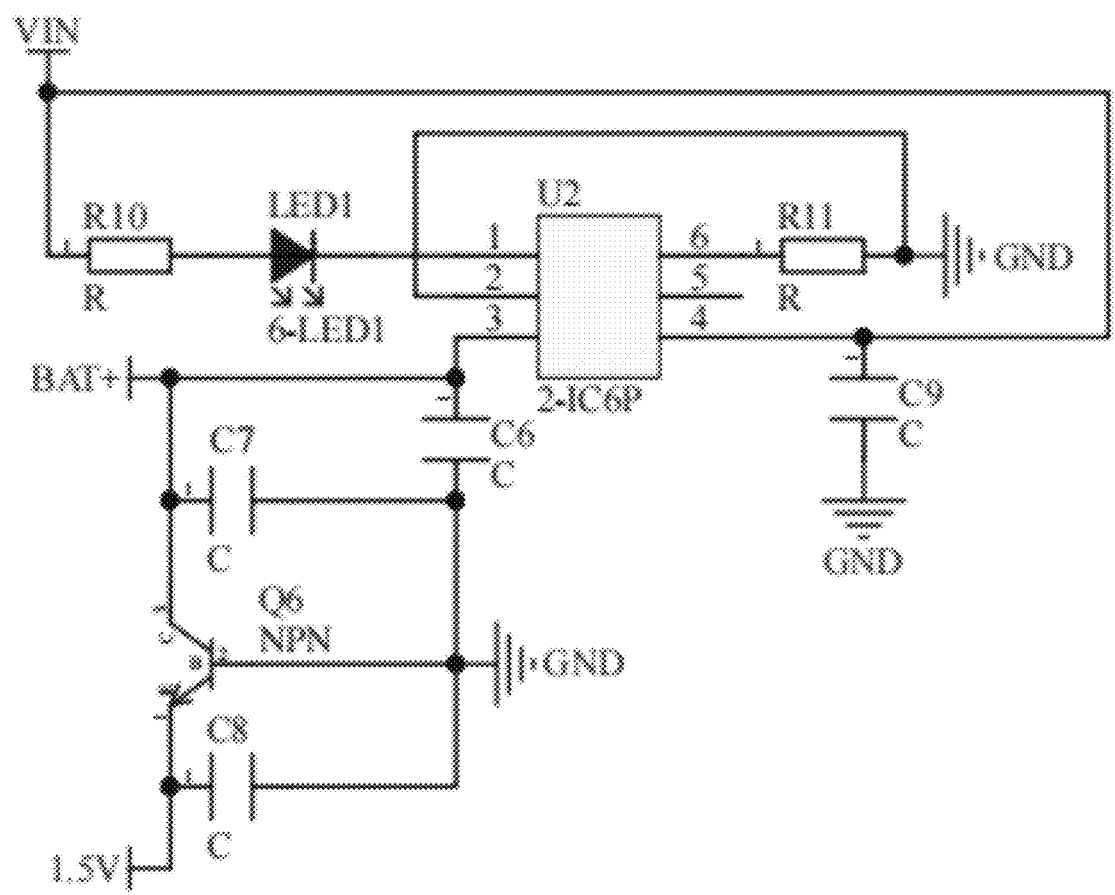
FIG. 27 is a circuit diagram of the power circuit according to the present invention.
Figure 28:
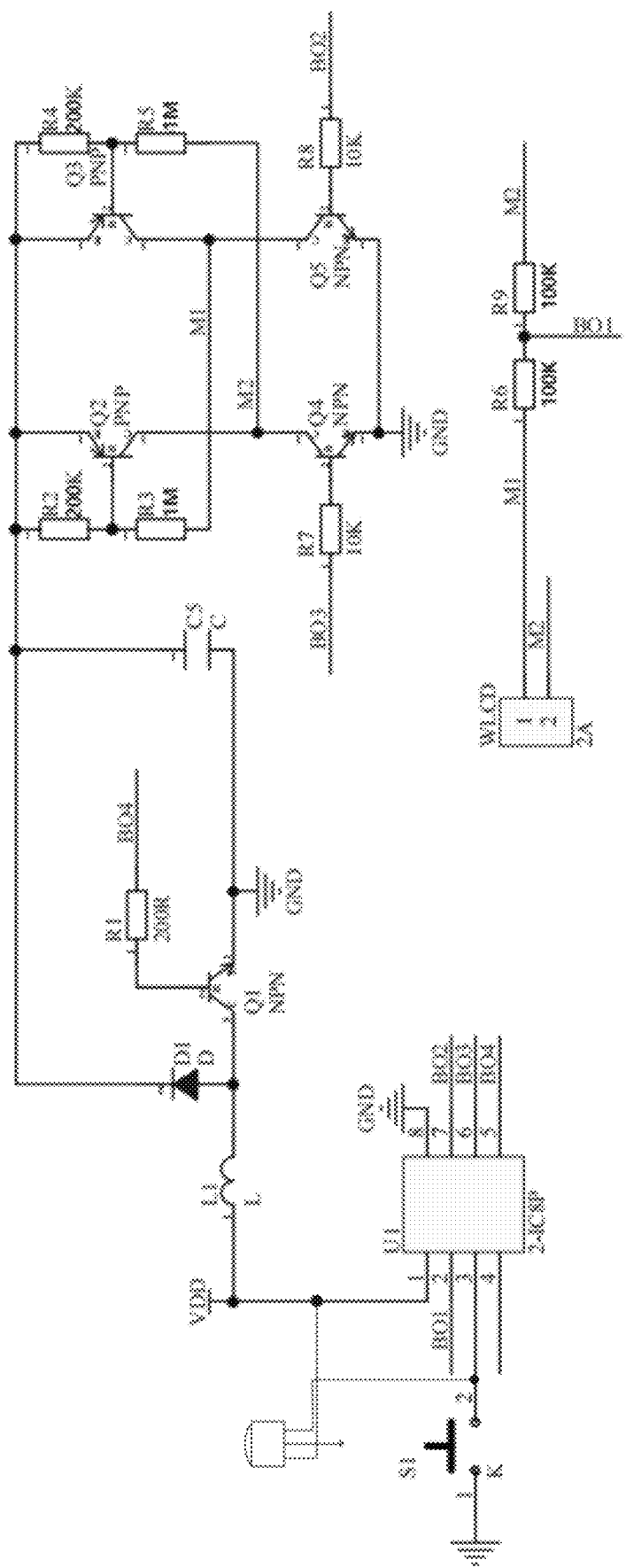
FIG. 28 is a circuit diagram of the boost module according to the present invention.

Referring to FIGS. 26-28, in one embodiment, the first circuit board 170 is integrated with a power circuit 80 and a boost module 50. The power circuit 80 is respectively electrically connected to the second circuit board 160, the first battery 180, and the boost module 50. The power circuit 80 can be used for connecting to external power supply, so as to charge the first battery 180. The power circuit 80 can also be used for managing the charging and discharging of the first battery 180. The power circuit 80 can also be electrically connected to the first photovoltaic panel 110 to process the electrical energy converted from light energy by the first photovoltaic panel 110 and then store the electrical energy into the first battery 180. The boost module 50 is respectively electrically connected to the first clear switch 173 and the first LCD screen 210. In this way, when the boost module 50 detects the electrical signal fed back by the first clear switch 173, the boost module 50 boosts the voltage output by the power circuit 80 and then transfers the boosted voltage to the first LCD screen 210 to clear the content on the first LCD screen 210.

Specifically, the boost module 50 includes a boost chip U1, a first inductor L1, a first diode D1, a first transistor Q1, a first resistor R1, a first capacitor C5, a second resistor R2, a third resistor R3, a second transistor Q2, a fourth resistor R4, a fifth resistor R5, a sixth resistor R6, a ninth resistor R9, a third transistor Q3, a fourth transistor Q4, a seventh resistor R7, a fifth transistor Q5, an eighth resistor R8, and a connection interface WLCD.

A model of the boost chip U1 can be SAP02. A first pin of the boost chip U1 is connected to a collector electrode of the first transistor Q1 through the first inductor L1. The collector electrode of the first transistor Q1 is connected to the first capacitor C5, the second resistor R2, a first pin of the second transistor Q2, a third pin of the third transistor Q3, and the fourth resistor R4 respectively after passing through the first diode D1. A second pin of the boost chip U1 is connected at a connection between the sixth resistor R6 and the ninth resistor R9. A fifth pin of the boost chip U1 is connected to a base electrode of the first transistor Q1 through the first resistor R1. A sixth pin of the boost chip U1 1 is connected to a base electrode of the fourth transistor Q4 through the seventh resistor R7. A seventh pin of the boost chip U1 is connected to a base electrode of the fifth transistor Q5 through the eighth resistor R8. An emitter electrode of the first transistor Q1 and one end of the first capacitor C5 are grounded. Two ends of the second resistor R2 are respectively connected to a base electrode of the second transistor Q2 and a collector electrode of the second transistor Q2. Two ends of the third resistor R3 are respectively connected to the base electrode of the second transistor Q2 and a collector electrode of the third transistor Q3. Two ends of the fourth resistor R4 are respectively connected to a base electrode of the third transistor Q3 and an emitter electrode of the third transistor Q3. Two ends of the fifth resistor R5 are respectively connected to the base electrode of the third transistor Q3 and a collector electrode of the fourth transistor Q4. The collector electrode of the second transistor Q2 is electrically connected to the collector electrode of the fourth transistor Q4. An emitter electrode of the fourth transistor Q4 and an emitter electrode of the fifth transistor Q5 are both grounded. The first transistor Q1, the fourth transistor Q4, and the fifth transistor Q5 are all NPN type transistors. The second transistor Q2 and the third transistor Q3 are PNP type transistors.

When the first clear switch 173 is the Hall switch, the first pin of the boost chip U1 is further connected to the power circuit 80 and a first pin of the Hall switch, and a third pin of the Hall switch is connected to a third pin of the boost chip U1. When the first clear switch 173 is a button switch, one end of the button switch is connected to the third pin of the boost chip U1, and an opposite end of the button switch is grounded.

The connection interface WLCD is configured for connecting the first LCD screen 210. A first pin of the connection interface WLCD sequentially passes through the sixth resistor R6 and the ninth resistor R9, and then is connected to the collector electrode of the third transistor Q3. A second pin of the connection interface WLCD is connected to the collector electrode of the fourth transistor Q4.

When the button switch is turned on, a voltage on the third pin of the boost chip U1 is reduced. Alternatively, when the boost chip U1 detects a voltage fed back by the Hall switch, the boost chip U1 outputs a voltage of a certain frequency to the first transistor Q1 through the first resistor R1, and a return circuit (loop) of the first inductor L1 is utilized to achieve voltage boost. Then, through a return circuit (loop) of the second transistor Q2 and the fourth transistor Q4, the boosted voltage is output to the first LCD screen 210 through the connection interface WLCD, so as to clear the content on the first LCD screen 210.

Referring to FIGS. 1-12, in one embodiment, the first battery 180 is a button battery, and an arched first conductive sheet 172 is provided on the first circuit board 170. The calculator unit 100 is detachably equipped with a first pulling element 143, and a first receiving slot 1434 is defined in the first pulling element 143. The first battery 180 is positioned in the first receiving slot 1434. When the first pulling element 143 is partially placed inside the calculator unit 100, one surface of the first battery 180 abuts against a solder pad on the first circuit board 170, and an opposite surface of the first battery 180 abuts against the first conductive sheet 172. Therefore, when the first battery 180 runs out of battery, the user can remove the first pulling element 143 from the calculator unit 100 to replace the first battery 180, and then install the first pulling element 143, so as to improve a service life of the product in this embodiment.

Specifically, the first pulling element 143 is fixed to the calculator unit 100 by a screw at one end of the first receiving slot 1434. The first pulling element 143 is provided with a first elastic element 1431 at an opposite end of the first receiving slot 1434. A first fixing block 1433 is provided on the first elastic element 1431. The calculator unit 100 is provided with a first fixing slot 1432 at a position corresponding to the first fixing block 1433. The first fixing block 1433 is placed in the first fixing slot 1432 when the first pulling element 143 is installed on the calculator unit 100. That is, one side of the first pulling element 143 is fixed to the calculator unit 100 in a form of a buckle, and an opposite side of the first pulling element 143 is fixed with the screw, so as to stably fix the first pulling element 143 on the calculator unit 100. When the first pulling element 143 needs to be disassembled, the screw can be unscrewed, and then the first pulling element 143 is pulled with force, so that the first pulling element 143 is removed from the calculator unit 100.

In one embodiment, in order to facilitate the disassembly and assembly of the first pulling element 143, a side surface of the first fixing block 1433 and a side surface of the first fixing slot 1432 are inclined surfaces, so that the first fixing block 1433 can be placed inside the first fixing slot 1432, and the first fixing block 1433 can also be easily detached from the first fixing slot 1432.

In the above embodiments, the calculator unit 100 includes a third outer housing 140. The third outer housing 140 includes a third front housing 142 and a third bottom housing 141. The third front housing 142 and the third bottom housing 141 can be connected by a buckle or a screw. The third front housing 142 is connected to the third bottom housing 141 to form the first wiring hole 30. The second rotating part 146 and the third front housing 142 are integrally formed by injection molding. The first button module group 130 is positioned on the third front housing 142. The first locking switch 171 is arranged on the first circuit board 170. The first clear switch 173 is arranged on the second circuit board 160. By electrically connecting the second circuit board 160 to the first circuit board 170, the first clear switch 173 is electrically connected to the first circuit board 170. The first circuit board 170 is positioned behind the first display 120. The first display 120 is arranged on the third front housing 142. The first pulling element 143 is locked on the third front housing 142 through the screw. The first battery 180 is positioned on one side of the first circuit board 170 near the third front housing 142. The first circuit board 170 is equipped with a first switch button. By operating the first button module 130, the calculator unit 100 can be turned on for numerical calculation. The third front housing 142 is equipped with a through hole 149 at a position corresponding to the Hall switch, so that the Hall switch can detect the magnetic field generated by the magnetic field magnet 320.

The handwriting pad unit 200 includes a fourth outer housing 220. The fourth outer housing 220 includes a fourth front housing 222 and a fourth bottom housing 221. The fourth front housing 222 can be connected to the fourth bottom housing 221 by a buckle or a screw. The fourth front housing 222 is connected to the fourth bottom housing 221 to form the second wiring hole 40. The first rotating part 223 and the fourth front housing 222 are integrally formed by injection molding.

The third front housing 142 is recessed at a position corresponding to the first rotating part 223 to form a first avoidance slot 148, and the fourth front housing 222 is recessed at a position corresponding to the second rotating part 146 to form a second avoidance slot 60. When the first rotating part 223 is connected to the second rotating part 146, the second rotating part 146 is at least partially placed inside the second avoidance slot 60, and the first rotating part 223 is at least partially placed inside the first avoidance slot 148, thereby reducing a thickness of the calculator unit 100 and the handwriting pad unit 200 when in the storage state.

In the above embodiments, the first battery 180 is only configured inside the calculator unit 100, and the flexible connection wire 10 is used for controlling the handwriting pad unit 200 and powering the handwriting pad unit 200. Moreover, the handwriting pad unit 200 is not equipped with a battery, a circuit board, a clear switch, and a locking switch, which can maximize a volume of the first LCD screen 210 and increase a handwriting area, thereby improving the user experience of the handwriting pad unit 200.

In one embodiment, the fourth front housing 222 is provided with a second display opening 224 at a position corresponding to the first LCD screen 210, so that the user can write on the first LCD screen 210. A height of a side wall of the second display opening 224 is equal to or greater than a height of the first button module group 130 protruding from an outer side of the third front housing 142. Therefore, when the calculator unit 100 and the handwriting pad unit 200 are folded and stored, the first button module group 130 protruding from the outer side of the third front housing 142 can be placed on the side wall formed by the second display opening 224, so that the first magnetic attraction element 150 can attract with the second magnetic attraction element 230, and the calculator unit 100 can abut against a surface of the handwriting pad unit 200.

In one embodiment, a storage slot 147 is provided on the third outer housing 140 for storing the handwriting pen 300. When the handwriting pen 300 is placed in the storage slot 147, the handwriting pen 300 is fixed through a buckle structure. Specifically, a top portion of the handwriting pen 300 is equipped with a friction convex block 310. A window 311 is defined in the third outer housing 140 at a position corresponding to the friction convex block 310. The user can remove the handwriting pen 300 from the storage slot 147 by moving the friction convex block 310, making it convenient for the user to use.

When the handwriting pad unit 200 is connected to the calculator unit 100 by magnetic attraction, the fourth front housing 222 is connected to the fourth bottom housing 221 to form a first installation slot 70. The third magnetic attraction elements 530 are arranged inside the first installation slot 70, so that the third magnetic attraction elements 530 are fixed. The third front housing 142 is connected to the third bottom housing 141 to form second installation slots 443. The fourth magnetic attraction elements 460 are arranged inside the second installation slots 443, so that the fourth magnetic attraction elements 460 are fixed. In other embodiments, the third magnetic attraction elements 530 can also be fixed to the fourth front housing 222 or the fourth bottom housing 221 by injection molding. The fourth magnetic attraction elements 460 can also be fixed to the third front housing 142 or the third bottom housing 141 by injection molding. Alternatively, the third magnetic attraction elements 530 can be fixed to the fourth outer housing 220 by using a buckle or by gluing, and the fourth magnetic attraction elements 460 can also be fixed to the third outer housing 140 by using a buckle or by gluing.

Referring to FIGS. 15-18, when the handwriting pad unit 200 and calculator unit 100 are both internally configured with a separate power supply, the handwriting pad unit 200 includes a first outer housing 520, a second battery 540, a third circuit board 560, and a second liquid crystal display (LCD) screen 510. The third circuit board 560, the second battery 540, and the second LCD screen 510 are all arranged inside the first outer housing 520. The second LCD screen 510 and the second battery 540 are both electrically connected to the third circuit board 560. The third circuit board 560 is positioned above or below the second LCD screen 510. A first display opening 523 is defined in a surface of the first outer housing 520 at a position corresponding to the second LCD screen 510. The second battery 540 can provide power to the third circuit board 560 and the second LCD screen 510. The third circuit board 560 is equipped with a second clear switch 562. The first outer housing 520 is equipped with a first pressing element 524 at a position corresponding to the second clear switch 562. The first pressing element 524 is connected to the second clear switch 562. When the third circuit board 560 detects an electrical signal fed back by the second clear switch 562, the third circuit board 560 controls the second LCD screen 510 to clear the displayed content. Therefore, when the user needs to clear the content on the second LCD screen 510, the first pressing element 524 can be operated and pressed.

In one embodiment, a second locking switch 561 is provided on the third circuit board 560. A first operating element 525 is arranged on the first outer housing 520 at a position corresponding to the second locking switch 561. The first operating element 525 is connected to the second locking switch 561. When the third circuit board 560 detects an electrical signal fed back by the second locking switch 561, the content displayed on the second LCD screen 510 is locked. Therefore, when the user needs to lock the content on the second LCD screen 510 from being accidentally cleared, the first operating element 525 can be operated and pressed.

Specifically, the second locking switch 561 is a dual in-line package (DIP) switch. The first pressing element 524 is positioned on a surface of the first outer housing 520 equipped with the first display opening 523, and the second locking switch 561 is positioned at a top portion of the first outer housing 520.

In one embodiment, the top portion of the first outer housing 520 is detachably provided with a second pulling element 550. A second receiving slot 551 is defined in the second pulling element 550. A second conductive sheet 563 in an arched shape is provided on the third circuit board 560. The second battery 540 is a button battery, and the second battery 540 is installed on the second receiving slot 551. When the second pulling element 550 is assembled onto the first outer housing 520, the second receiving slot 551 is placed inside the first outer housing 520 and below the second conductive sheet 563. One surface of the second battery 540 abuts against the second conductive sheet 563, and an opposite surface of the second battery 540 abuts against a solder pad on the third circuit board 560. When the second battery 540 runs out of power, the user can remove the second pulling element 550 from the first outer housing 520 to replace the second battery 540, and then install the second pulling element 550, so as to improve the service life of the product in this embodiment.

Specifically, one end of the second pulling element 550 is fixed to the first outer housing 520 by a screw. The second pulling element 550 is provided with a third fixing block 552 on a side wall corresponding to the second receiving slot 551. The first outer housing 520 is provided with a third fixing slot 554 at a position corresponding to the third fixing block 552. The third fixing block 552 is placed in the third fixing slot 554 when the second pulling element 550 is installed on the first outer housing 520. That is, one side of the second pulling element 550 is fixed to the first outer housing 520 in a form of a buckle, and an opposite side of the second pulling element 550 is fixed by a screw, so as to stably fix the second pulling element 550 on the first outer housing 520. When the second pulling element 550 needs to be removed, the screw can be unscrewed, and then the second pulling element 550 is forcefully pulled, so as to remove the second pulling element 550 from the first outer housing 520.

In one embodiment, in order to facilitate the disassembly and assembly of the second pulling element 550, a side surface of the third fixing block 552 and a side surface of the third fixing slot 554 are inclined surfaces, so that the third fixing block 552 can be placed inside the third fixing slot 554, and the third fixing block 552 can also be easily detached from the third fixing slot 554.

The calculator unit 100 includes a second outer housing 440, a second display 410, a fourth circuit board 450, a second button module group 430, and a third battery 480. The fourth circuit board 450, the third battery 480, and the second display 410 are all positioned inside the second outer housing 440. The second button module group 430 is positioned on the second outer housing 440 and corresponds to the fourth circuit board 450. The third battery 480 and the second display 410 are both electrically connected to the fourth circuit board 450. The third battery 480 and the second display 410 are both positioned above the fourth circuit board 450. The fourth circuit board 450 calculates the input data when the second button module group 430 is operated. The third battery 480 can provide power to the fourth circuit board 450, and the calculator unit 100 can be turned on by operating the second button module group 430, so as to perform numerical calculation.

In one embodiment, the calculator unit 100 is equipped with a second photovoltaic panel 420. The second photovoltaic panel 420 is electrically connected to the fourth circuit board 450. The third battery 480 is a rechargeable battery. The second photovoltaic panel 420 is configured for converting light energy into electrical energy and transmitting the electrical energy to the fourth circuit board 450. The fourth circuit board 450 is configured for processing the electrical energy transmitted by the second photovoltaic panel 420, and then the electrical energy is stored into the third battery 480 through the fourth circuit board 450, so as to improve the service life of the third battery 480 and save resources.

In one embodiment, a top portion of the second outer housing 440 is detachably equipped with a third pulling element 470 at a position corresponding to the third battery 480. The third pulling element 470 is provided with a third receiving slot 471. The fourth circuit board 450 is provided with an arched third conductive sheet 451. The third battery 480 is a button battery. The third battery 480 is installed on the third receiving slot 471. When the third pulling element 470 is assembled onto the second outer housing 440, the third receiving slot 471 is placed inside the second outer housing 440 and below the third conductive sheet 451. One surface of the third battery 480 abuts against the third conductive sheet 451, and an opposite surface of the third battery 480 abuts against a solder pad on the fourth circuit board 450. When the third battery 480 runs out of battery, the user can remove the third pulling element 470 from the second outer housing 440 to replace the third battery 480, and then install the third pulling element 470, so as to improve the service life of the product in this embodiment.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A calculator with a handwriting pad, comprising a handwriting pad unit, a calculator unit, and a handwriting pen;
   wherein the handwriting pen is detachably arranged on the calculator unit or the handwriting pad unit, and the handwriting pad unit is connected to the calculator unit;
   when in a storage state, the handwriting pad unit and the calculator unit are arranged in an overlapped manner from up to down;
   when in an unfolded state, a surface of the handwriting pad unit is horizontally arranged side by side with the calculator unit,
   wherein the handwriting pad unit is rotationally connected to the calculator unit,
   wherein at least one first rotating part is provided on the handwriting pad unit, a second rotating part is provided on the calculator unit for use in conjunction with the first rotating part, and the first rotating part is connected to the second rotating part through a shaft rod;
   at least one first magnetic attraction element is provided within the calculator unit, a second magnetic attraction element is provided on the handwriting pad unit for use with the first magnetic attraction element, and the first magnetic attraction element is attracted with the second magnetic attraction element when the handwriting pad unit and the calculator unit are in the storage state;
   the calculator unit is equipped with a storage slot for storing the handwriting pen, and the handwriting pen is fixed by a buckle structure when placed in the storage slot.

2. The calculator with the handwriting pad of claim 1, wherein the handwriting pad unit is connected to the calculator unit through magnetic attraction.

3. The calculator with the handwriting pad of claim 2, wherein a plurality of third magnetic attraction elements are provided on the handwriting pad unit, and at least one part of the third magnetic attraction elements are positioned near a peripheral side of the handwriting pad unit; the calculator unit is equipped with fourth magnetic attraction elements, and the fourth magnetic attraction elements are attracted with the third magnetic attraction elements;
   the third magnetic attraction elements are magnets or iron blocks, and the fourth magnetic attraction elements are magnets; alternatively, the third magnetic attraction elements are magnets, and the fourth magnetic attraction elements are iron blocks.

4. The calculator with the handwriting pad of claim 3, wherein a total number of the third magnetic attraction elements and a total number of the fourth magnetic attraction elements are both four, and the four third magnetic attraction elements are respectively arranged near four end corners of the handwriting pad unit;

both the third magnetic attraction elements and the fourth magnetic attraction elements are in a long strip shape, three of the third magnetic attraction elements are arranged along a lengthwise direction of the calculator unit, and one of the third magnetic attraction elements is arranged along a width direction of the calculator unit.

5. The calculator with the handwriting pad of claim 1, wherein the handwriting pad unit is slidably connected to the calculator unit.

6. The calculator with the handwriting pad of claim 5, wherein a sliding slot is provided on a back surface of the handwriting pad unit for accommodating the calculator unit; when in the storage state, the calculator unit is placed inside the sliding slot;

a position limiting convex bar is provided on a side wall of the sliding slot, and a second fixing slot is provided on the position limiting convex bar; a position limiting slot is provided on a side wall of the calculator unit for use in conjunction with the position limiting convex bar, the position limiting slot is positioned near an end of the calculator, and a second fixing block is provided on the position limiting slot for use in conjunction with the second fixing slot; when in the storage state, the position limiting convex bar is placed in the position limiting slot, and the second fixing block is placed in the second fixing slot.

7. The calculator with the handwriting pad of claim 6, wherein the handwriting pad unit protrudes outward on one side away from the sliding slot to form a supporting convex block.

8. The calculator with the handwriting pad of claim 1, wherein the handwriting pad unit is connected to the calculator unit through a buckle;

one side wall of the handwriting pad unit is equipped with a plurality of connecting fixing blocks, one side wall of the calculator unit is equipped with a plurality of fixing slots for use in conjunction with the plurality of connecting fixing blocks, and the plurality of connecting fixing blocks are placed inside the plurality of fixing slots when the handwriting pad unit is connected to the calculator unit;

the handwriting pad unit is equipped with a magnetic attraction element, the calculator unit is equipped with a magnetic attraction element, and the magnetic attraction element is attracted with the magnetic attraction element when the handwriting pad unit and the computer unit are stored.

9. A calculator with a handwriting pad, comprising a handwriting pad unit, a calculator unit, and a handwriting pen;

wherein the handwriting pen is detachably arranged on the calculator unit or the handwriting pad unit, and the handwriting pad unit is connected to the calculator unit;

when in a storage state, the handwriting pad unit and the calculator unit are arranged in an overlapped manner from up to down;

when in an unfolded state, a surface of the handwriting pad unit is horizontally arranged side by side with the calculator unit, wherein the calculator with the handwriting pad further comprises a flexible connection wire;

the calculator unit is equipped with a first circuit board and a first clear switch electrically connected to the first circuit board, and the handwriting pad unit is equipped with a first LCD screen; the calculator unit is provided with a first wiring hole on one side near the handwriting pad unit, and the handwriting pad unit is provided with a second wiring hole on one side near the calculator unit; the flexible connection wire passes through the first wiring hole and the second wiring hole, one end of the flexible connection wire is placed inside the calculator unit and soldered to the first circuit board, and an opposite end of the flexible connection wire is placed inside the handwriting pad unit and soldered to the first LCD screen; when the first clear switch is operated, the first circuit board clears a content displayed on the first LCD screen through the flexible connection wire;

the calculator unit is further equipped with a first locking switch electrically connected to the first circuit board, and when the first circuit board receives an electrical signal fed back by the first locking switch, the first circuit board locks the content displayed on the first LCD screen through the flexible connection wire.

10. The calculator with the handwriting pad of claim 9, wherein a side wall of the first wiring hole and/or a side wall of the second wiring hole along a lengthwise direction are/is smooth curved surfaces;

a total sum of a distance between a bottom surface of the first circuit board and the first wiring hole, a width of the first wiring hole, a distance between the first wiring hole and the second wiring hole, a width of the second wiring hole, and a distance between the second wiring hole and the first LCD screen is a first length;

after a part welded to the first circuit board and a part welded to the first LCD screen are deducted from the flexible connection wire, a remaining length of the flexible connection wire is greater than the first length.

11. The calculator with the handwriting pad of claim 10, wherein the first clear switch is a Hall switch, and an end of the handwriting pen is provided with a magnetic field magnet for generating a magnetic field; when the first circuit board receives an electrical signal fed back by the Hall switch, the content displayed on the first LCD screen is cleared through the flexible connection wire.

12. The calculator with the handwriting pad of claim 11, wherein the calculator unit is equipped with a first battery, a second circuit board, a first display, and a first button module group; the first circuit board and the first display are both electrically connected to the second circuit board, and the first battery is electrically connected to the first circuit board; the first battery, the first circuit board and the first display are all positioned above the second circuit board, and the second circuit board performs a calculation on input data when the first button module group is operated;

the calculator unit is equipped with a first photovoltaic panel, the first photovoltaic panel is electrically connected to the second circuit board, the first battery is a rechargeable battery, the first photovoltaic panel is configured for converting light energy into electrical energy and transmitting the electrical energy to the second circuit board, and the second circuit board is configured for processing the electrical energy transmitted by the first photovoltaic panel and then storing the electrical energy into the first battery through the first circuit board.

13. The calculator with the handwriting pad of claim 12, wherein the first circuit board is integrated with a power circuit and a boost module, and the power circuit is respectively electrically connected to the second circuit board, the first battery, and the boost module; the boost module is respectively electrically connected to the first clear switch and the first LCD screen; when the boost module detects the electrical signal fed back by the first clear switch, the boost module boosts the voltage output by the power circuit and then transfers the boosted voltage to the first LCD screen to clear the content on the first LCD screen.

14. The calculator with the handwriting pad of claim 12, wherein the first battery is a button battery, an arched first conductive sheet is provided on the first circuit board, the calculator unit is detachably equipped with a first pulling element, a first receiving slot is defined in the first pulling element, and the first battery is positioned in the first receiving slot; when the first pulling element is partially placed inside the calculator unit, one surface of the first battery abuts against a solder pad on the first circuit board, and an opposite surface of the first battery abuts against the first conductive sheet;

the first pulling element is fixed to the calculator unit by a screw at one end of the first receiving slot, the first pulling element is provided with a first elastic element at an opposite end of the first receiving slot, a first fixing block is provided on the first elastic element, the calculator unit is provided with a first fixing slot at a position corresponding to the first fixing block, and the first fixing block is placed in the first fixing slot when the first pulling element is installed on the calculator unit.

15. A calculator with a handwriting pad, comprising a handwriting pad unit, a calculator unit, and a handwriting pen;

wherein the handwriting pen is detachably arranged on the calculator unit or the handwriting pad unit, and the handwriting pad unit is connected to the calculator unit;

when in a storage state, the handwriting pad unit and the calculator unit are arranged in an overlapped manner from up to down;

when in an unfolded state, a surface of the handwriting pad unit is horizontally arranged side by side with the calculator unit, wherein when the handwriting pad unit is connected to the calculator unit by one of the methods of rotation, magnetic attraction, buckle, and sliding, the handwriting pad unit comprises a first outer housing, a first battery, a first circuit board, and a LCD screen; the first circuit board, the first battery, and the LCD screen are all arranged inside the first outer housing; the LCD screen and the first battery are both electrically connected to the first circuit board, the first circuit board is positioned above or below the LCD screen, and a first display opening is defined in a surface of the first outer housing at a position corresponding to the LCD screen;

the first circuit board is equipped with a clear switch, the first outer housing is equipped with a first pressing element at a position corresponding to the clear switch, the first pressing element is connected to the clear switch, and when the first circuit board detects an electrical signal fed back by the clear switch, the first circuit board controls the LCD screen to clear the displayed content;

a locking switch is provided on the first circuit board, a first operating element is arranged on the first outer housing at a position corresponding to the locking switch, the first operating element is connected to the locking switch, and when the first circuit board detects an electrical signal fed back by the locking switch, the content displayed on the LCD screen is locked.

16. The calculator with the handwriting pad of claim 15, wherein the top portion of the first outer housing is detachably provided with a first pulling element, a first receiving slot is defined in the first pulling element, a first conductive sheet in an arched shape is provided on the first circuit board, the first battery is a button battery, and the first battery is installed on the first receiving slot; when the first pulling element is assembled onto the first outer housing, the first receiving slot is placed inside the first outer housing and below the first conductive sheet, one surface of the first battery abuts against the first conductive sheet, and an opposite surface of the first battery abuts against a solder pad on the first circuit board;

one end of the first pulling element is fixed to the first outer housing by a screw, the first pulling element is provided with a fixing block on a side wall corresponding to the first receiving slot, the first outer housing is provided with a fixing slot at a position corresponding to the fixing block, and the fixing block is placed in the fixing slot when the first pulling element is installed on the first outer housing.

17. The calculator with the handwriting pad of claim 15, wherein the calculator unit comprises a second outer housing, a display, a second circuit board, a button module group, and a second battery; the second circuit board, the second battery, and the display are all positioned inside the second outer housing; the button module group is positioned on the second outer housing and corresponds to the second circuit board, and the second battery and the display are both electrically connected to the second circuit board; the second battery and the display are both positioned above the second circuit board, and the second circuit board calculates the input data when the button module group is operated;

the calculator unit is equipped with a second photovoltaic panel, the second photovoltaic panel is electrically connected to the second circuit board, the second battery is a rechargeable battery, the second photovoltaic panel is configured for converting light energy into electrical energy and transmitting the electrical energy to the second circuit board, the second circuit board is configured for processing the electrical energy transmitted by the photovoltaic panel, and then the electrical energy is stored into the second battery through the second circuit board.

18. The calculator with the handwriting pad of claim 17, wherein a top portion of the second outer housing is detachably equipped with a second pulling element at a position corresponding to the second battery, the second pulling element is provided with a second receiving slot, the second circuit board is provided with an arched second conductive sheet, the battery is a button battery, and the second battery is installed on the second receiving slot; when the second pulling element is assembled onto the second outer housing, the second receiving slot is placed inside the second outer housing and below the second conductive sheet, one surface of the second battery abuts against the second conductive sheet, and an opposite surface of the second battery abuts against a solder pad on the second circuit board.

19. The calculator with the handwriting pad of claim 15, wherein the locking switch is a dual in-line package switch, the first pressing element is positioned on a surface of the first outer housing equipped with the first display opening, and the locking switch is positioned at a top portion of the first outer housing.

\* \* \* \* \*